(12) United States Patent
Sampath et al.

(10) Patent No.: US 8,670,307 B2
(45) Date of Patent: Mar. 11, 2014

(54) FLOW BASED FAIR SCHEDULING IN MULTI-HOP WIRELESS NETWORKS

(75) Inventors: Ashwin Sampath, San Diego, CA (US); David Jonathan Julian, San Diego, CA (US); Gavin Bernard Horn, La Jolla, CA (US); Husheng Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1543 days.

(21) Appl. No.: 11/495,002

(22) Filed: Jul. 27, 2006

(65) Prior Publication Data

US 2007/0091863 A1  Apr. 26, 2007

Related U.S. Application Data

(60) Provisional application No. 60/730,146, filed on Oct. 24, 2005, provisional application No. 60/730,213, filed on Oct. 24, 2005.

(51) Int. Cl.
*H04L 12/28* (2006.01)
*H04W 4/00* (2009.01)
*H04J 3/16* (2006.01)

(52) U.S. Cl.
USPC ........... 370/229; 370/235; 370/252; 370/328; 370/338; 370/468

(58) Field of Classification Search
None
See application file for complete search history.

(56) References Cited

U.S. PATENT DOCUMENTS

| | | |
|---|---|---|
| 5,745,480 A | 4/1998 | Behtash et al. |
| 6,628,629 B1 | 9/2003 | Jorgensen |
| 6,735,448 B1 | 5/2004 | Krishnamurthy et al. |
| 6,836,463 B2 | 12/2004 | Garcia-Luna-Aceves |
| 7,095,722 B1 | 8/2006 | Walke et al. |
| 7,184,703 B1 | 2/2007 | Naden et al. |
| 7,277,394 B2 | 10/2007 | Hester et al. |
| 7,466,985 B1 | 12/2008 | Handforth et al. |
| 7,606,210 B2 | 10/2009 | Ratiu et al. |
| 7,633,894 B2 | 12/2009 | Cruz et al. |
| 7,720,020 B2 | 5/2010 | Larsson |
| 2002/0013151 A1 | 1/2002 | Saito et al. |
| 2002/0067736 A1 | 6/2002 | Garcia-Luna-Aceves et al. |
| 2002/0071395 A1 | 6/2002 | Redi et al. |
| 2002/0114303 A1 | 8/2002 | Crosbie et al. |
| 2003/0058826 A1 | 3/2003 | Shearer, III |
| 2003/0123410 A1 | 7/2003 | Youm |

(Continued)

FOREIGN PATENT DOCUMENTS

| | | |
|---|---|---|
| EP | 1739993 | 1/2007 |
| JP | 2002033698 A | 1/2002 |

(Continued)

OTHER PUBLICATIONS

Daehyon Kim, Fair and Efficient Multihop Scheduling algorithm for IEEE 802.16 BWA systems, Oct. 7, 2005, IEEE pp. 895-902.*

(Continued)

*Primary Examiner* — Steven H Nguyen
(74) *Attorney, Agent, or Firm* — Dang M. Vo

(57) ABSTRACT

Embodiments describe flow based fair scheduling in a wireless multi-hop network. The scheduling can be rate controlled multi-hop scheduling or power controlled multi-hop scheduling. The scheduling chosen is intended to provide maxmin fairness over all flows within the wireless network.

20 Claims, 15 Drawing Sheets

(56) References Cited

U.S. PATENT DOCUMENTS

| | | |
|---|---|---|
| 2003/0161268 A1 | 8/2003 | Larsson et al. |
| 2004/0143842 A1 | 7/2004 | Joshi |
| 2004/0208183 A1 | 10/2004 | Balachandran et al. |
| 2005/0014510 A1 | 1/2005 | Jeon |
| 2005/0135360 A1 | 6/2005 | Shin et al. |
| 2005/0232183 A1 | 10/2005 | Sartori et al. |
| 2005/0245270 A1 | 11/2005 | Sartori et al. |
| 2006/0046643 A1 | 3/2006 | Izumikawa et al. |
| 2006/0159013 A1* | 7/2006 | Lee et al. .................... 370/229 |
| 2006/0217074 A1 | 9/2006 | Wakabayashi |
| 2007/0070959 A1 | 3/2007 | Almeroth et al. |
| 2007/0081507 A1 | 4/2007 | Koo et al. |
| 2010/0226275 A1 | 9/2010 | Sampath et al. |
| 2010/0226276 A1 | 9/2010 | Sampath et al. |
| 2010/0226335 A1 | 9/2010 | Sampath et al. |

FOREIGN PATENT DOCUMENTS

| | | |
|---|---|---|
| TW | 484283 | 4/2002 |
| TW | I240519 | 9/2005 |
| WO | WO03032586 | 4/2003 |
| WO | 2004023668 | 3/2004 |
| WO | WO2004068808 | 8/2004 |
| WO | WO2005034545 A1 | 4/2005 |
| WO | 2005074212 | 8/2005 |

OTHER PUBLICATIONS

European Search Report—EP10170658, Search Authority—Munich Oct. 6, 2010.
European Search Report, EP10153863, Munich (Mar. 29, 2010).
International Search Report—PCT/US06/034248—ISA/EPO—Mar. 21, 2007.
Written Opinion—PCT/US06/034248—ISA/EPO—Mar. 21, 2007.
Taiwanese Search Report—TW095129645—Search Authority/TIPO—Jul. 12, 2009.
"Definition and assessment of relay based 1-33 cellular deployment concepts for future radio scenarios considering 1st protocol characteristics", Internet Citation, [OnlineJ Jun. 30, 2005, XP002359228 Retrieved from the Internet: URL:https://www.ist-winner.org/DeliverableDocuments/D3.4.pdf>.
IEEE Std 802.16/2004, Part 16: Air Interface for Fixed Broadband Wireless Access Systems, pp. 1-893.
Kanero, Proposed Relay Method with P-MP Structure of IEEE-802.16/2004, Sep. 2005, pp. 1606-1611.

* cited by examiner

FLOW BASED FAIR SCHEDULING IN MULTI-HOP WIRELESS NETWORKS

CROSS-REFERENCE TO RELATED APPLICATIONS

This application claims the benefit of U.S. Provisional Application Ser. No. 60/730,146, filed Oct. 24, 2005, entitled "RATE CONTROLLED FLOW BASED FAIR SCHEDULING IN MULTIHOP WIRELESS NETWORKS," and U.S. Provisional Application Ser. No. 60/730,213, filed Oct. 24, 2005, entitled "RATE CONTROLLED FLOW BASED FAIR SCHEDULING IN MULTIHOP WIRELESS NETWORKS," both of which are assigned to the assignee hereof and hereby expressly incorporated by reference herein.

BACKGROUND

I. Field

The following description relates generally to wireless communications and more particularly to scheduling communication in a multi-hop wireless network.

II. Background

Wireless communication networks are utilized to communicate information regardless of where a user may be located (e.g., inside or outside) and regardless of whether the user is mobile or stationary. Wireless communication networks enable communication between a mobile device and with a base station or access point. The access point covers a geographic range or cell and, as a mobile device is operated, the mobile device may be moved in and out of these geographic cells. To achieve virtually uninterrupted communication, the mobile device is assigned resources of a cell it has entered and is de-assigned resources of the cell it has exited.

In a multi-hop topology, a communication or transmission is transferred through a number of hops instead of directly to a base station. A hop as referred to herein is a particular segment or leg of a communication path between a sender and a recipient wherein another device acts as a relay node to facilitate conveyance of the communication. In cellular systems, resource contention is typically on a per "cell" basis and fairness of resource sharing is handled per base station. In multi-hop wireless networks, resource contention may be over a large number of nodes. Traditional methods (e.g., 802.11's Carrier Sense Multiple Access Medium Access Control (CSMA MAC)) can be utilized to ensure fairness on an immediate "hop" basis, but not necessarily over all the hops that the packet traverses.

To overcome the aforementioned as well as other deficiencies, what is needed is a technique for providing fair scheduling over all the hops from source node to destination node (e.g., over the entire data path) in a multi-hop network.

SUMMARY

The following presents a simplified summary of one or more embodiments in order to provide a basic understanding of some aspects of such embodiments. This summary is not an extensive overview of the one or more embodiments, and is intended to neither identify key or critical elements of the embodiments nor delineate the scope of such embodiments. One of its purposes is to present some concepts of the described embodiments in a simplified form as a prelude to a more detailed description to be presented later.

In accordance with one or more embodiments and corresponding disclosure thereof, various aspects are described in connection with flow based fair scheduling. Flow based fair scheduling includes rate-controlled multi-hop scheduling and power controlled multi-hop scheduling. Control is provided regardless of the direction of traffic (e.g., from access terminal to access point or from access point to access terminal).

According to some embodiments is a method for supporting data communications. The method includes receiving at a parent node a desired throughput per data sink associated with each child node. The child node being communicatively coupled to the parent node. The method also includes determining a time each child node should be scheduled based on the desired throughputs and determining whether the parent node is an obstruction based on the determined scheduled times. The method also includes determining a throughput for supporting each data sink if the parent node is an obstruction.

In accordance with some embodiments is an apparatus for supporting data communication. The apparatus can include a receiver, a scheduler and a value adjuster. The receiver can receive a desired throughput per data sink associated with each child node that is communicatively coupled to a parent node. The scheduler can be configured to determine a time each child node should be scheduled based on the desired throughputs and to determine whether the parent node is an obstruction based on the determined scheduled times. The value adjuster can determine a throughput for supporting each data sink if the parent node is an obstruction.

In accordance with some embodiments is a computer readable medium comprising instructions that upon execution cause an apparatus to receive at a parent node a desired throughput per data sink associated with each child node and to determine a time each child node should be scheduled based on the desired throughputs. The child node being communicatively coupled to the parent node. The instructions further cause the apparatus to determine whether the parent node is an obstruction based on the determined scheduled times and to determine a throughput for supporting each data sink if the parent node is an obstruction.

According to some embodiments is a processor for supporting data communication. The processor being configured to receive at a parent node a desired throughput per data sink associated with each child node. The processor is further configured to determine a time each child node should be scheduled based on the desired throughputs. The child node being communicatively coupled to the parent node. The processor is further configured to determine whether the parent node is an obstruction based on the determined scheduled times and to determine a throughput for supporting each data sink if the parent node is an obstruction.

In accordance with some embodiments is an apparatus for supporting data communication. The apparatus comprising a means for receiving at a parent node a desired throughput per data sink associated with each child node and a means for determining a time each child node should be scheduled based on the desired throughputs. The child node being communicatively coupled to the parent node. Also included is a means for determining whether the parent node is an obstruction based on the determined scheduled times and a means for determining a throughput for supporting each data sink if the parent node is an obstruction.

According to some embodiments is a method of supporting data communications. The method includes receiving at a root node a desired throughput per data sink associated with each parent node. The parent node being communicatively coupled to the root node. The method also includes determining a time fraction each parent node should be scheduled based on the desired throughput and determining a scheduling policy based on the time fraction each parent node should be scheduled.

In accordance with some embodiments is an apparatus for supporting data communication. The apparatus includes a receiver that receives a desired throughput per data sink associated with each parent node. The parent node being communicatively coupled to a root node. Also included is a scheduler that determines a time fraction each parent node should be scheduled based on the desired throughput. The scheduler also establishes a scheduling policy based on the time fraction each parent node should be scheduled.

In accordance with some embodiments is a computer readable medium comprising instructions that upon execution cause an apparatus to receive at a root node a desired throughput per data sink associated with each parent node. The parent node is communicatively coupled to the root node. The instructions further cause the apparatus to determine a time fraction each parent node should be scheduled based on the desired throughput and to determine a scheduling policy based on the time fraction each parent node should be scheduled.

According to some embodiments is a processor for supporting data communication. The processor being configured to receive a desired throughput per data sink associated with each parent node and to determine a time fraction each parent node should be scheduled based on the desired throughput. The parent node being communicatively coupled to a root node. The processor further configured to determine a scheduling policy based on the time fraction each parent node should be scheduled.

In accordance with some embodiments is an apparatus for supporting data communication. The apparatus comprising a means for receiving a desired throughput per data sink associated with each parent node. A means for determining a time fraction each parent node should be scheduled based on the desired throughput and a means for determining a scheduling policy based on the time fraction each parent node should be scheduled are also included in the apparatus.

In accordance with some embodiments is a method of supporting data communications. The method includes receiving at a parent node a desired throughput per data sink associated with each child node and determining at least one of a transmit power and a receive power associated with each child node based on the desired throughput. The child node being communicatively coupled to each parent node. The method further includes determining whether the parent node is an obstruction based on at least one of the determined transmit power and the receive power and determining a throughput for supporting each data sink if the parent node is an obstruction.

In accordance with some embodiments is an apparatus for supporting data communication. The apparatus comprising a receiver, a calculator, and a value adjuster. The receiver is configured to receive a desired throughput per data sink associated with each child node. The child node being communicatively coupled to a parent node. The calculator determines at least one of a transmit power and a receive power associated with each child node based on the desired throughput. The calculator further determines whether the parent node is an obstruction based on at least one of the determined transmit power and the receive power. The value adjuster selects a throughput for supporting each data sink if the parent node is an obstruction.

According to some embodiments is a computer readable medium comprising instructions that upon execution cause an apparatus to receive at a parent node a desired throughput per data sink associated with each child node and to determine at least one of a transmit power and a receive power associated with each child node based on the desired throughput. The child node being communicatively coupled to each parent node. The instructions further cause the apparatus to determine whether the parent node is an obstruction based on at least one of the determined transmit power and the receive power and to determine a throughput for supporting each data sink if the parent node is an obstruction.

In accordance with some embodiments is a processor for supporting data communication. The processor being configured to receive a desired throughput per data sink associated with each child node and to determine at least one of a transmit power and a receive power associated with each child node based on the desired throughput. The processor further configured to determine whether a parent node is an obstruction based on at least one of the determined transmit power and the receive power and to determine a throughput for supporting each data sink if the parent node is an obstruction.

In accordance with some embodiments is an apparatus for supporting data communication. The apparatus comprising a means for receiving at a parent node a desired throughput per data sink associated with each child node and a means for determining at least one of a transmit power and a receive power associated with each child node based on the desired throughput. The child node being communicatively coupled to each parent node. The apparatus further comprising a means for determining whether the parent node is an obstruction based on at least one of the determined transmit power and the receive power and a means for determining a throughput for supporting each data sink if the parent node is an obstruction.

In accordance with some embodiments is a method of supporting data communications. The method comprising receiving at a root node a desired throughput per data sink associated with each parent node. The parent node being communicatively coupled to the root node. The method further comprising determining at least one of a transmit power and a receive power associated with each parent node and determining a scheduling policy based on at least one of the determined transmit and receive powers.

In accordance with some embodiments is an apparatus for supporting data communication. The apparatus comprising a receiver and a calculator. The receiver receives a desired throughput per data sink associated with each parent node. The parent node being communicatively coupled to a root node. The calculator determines at least one of transmit and receive powers associated with each parent node and establishes a scheduling policy based on at least one of the determined transmit and receive powers.

In accordance with some embodiments is a computer readable medium comprising instructions that upon execution cause an apparatus to receive at a root node a desired throughput per data sink associated with each parent node. The parent node being communicatively coupled to the root node. The instructions further cause the apparatus to determine at least one of a transmit power and a receive power associated with each parent node and to determine a scheduling policy based on at least one of the determined transmit and receive powers.

In accordance with some embodiments is a processor for supporting data communication. The processor being configured to receive a desired throughput per data sink associated with each parent node. The parent node being communicatively coupled to a root node. The processor further configured to determine at least one of a transmit power and a receive power associated with each parent node and determine a scheduling policy based on at least one of the determined transmit and receive powers.

According to some embodiments is an apparatus for supporting data communication. The apparatus comprising a means for receiving at a root node a desired throughput per data sink associated with each parent node. The parent node being communicatively coupled to the root node. The apparatus further comprising a means for determining at least one of a transmit power and a receive power associated with each parent node and a means for determining a scheduling policy based on at least one of the determined transmit and receive powers.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

GLOSSARY OF TERMS

Figure 1:
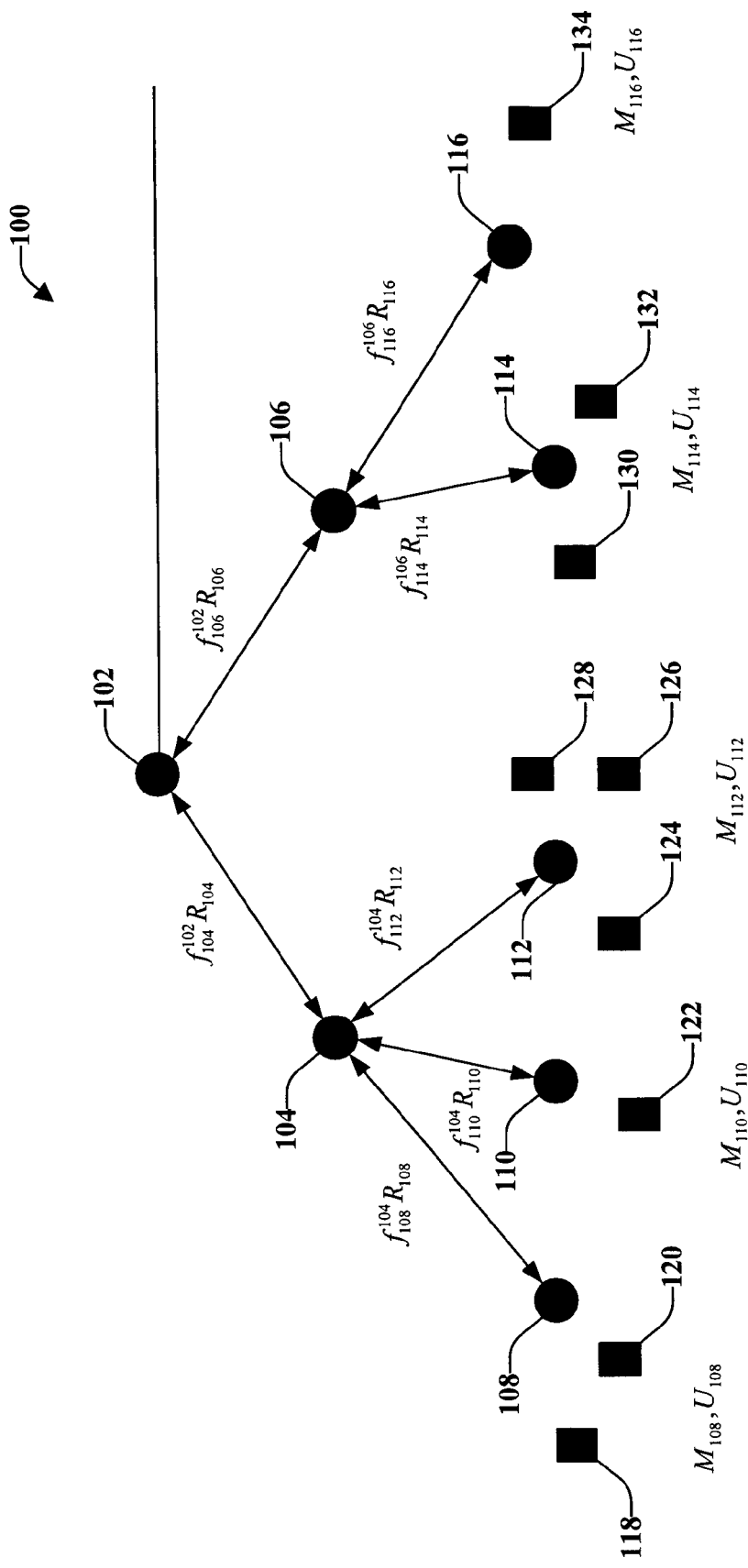
FIG. 1 is a representation of a multi-hop communication system in accordance with the various embodiments disclosed herein.

Forward Link=Data flow is from an access point to the access terminals.

Reverse Link=Data flow is from the access terminals to the wired access point.

Leaf Node=An access point node that only has access terminals communicatively coupled to it on the forward link.

Parent Node=An access point node that has at least one other access point node communicatively coupled to it on the forward link.

Child Node=An access point that can receive data on the forward link from another access point is considered a child node of that access point.

Root Node=Wired access point.

Sub-Tree for a Node=The set of all data sinks and access points to which the node can send data on the forward link using one or more hops.

Data Sinks and Data Sources=Access terminals are data sinks on the forward link and data sources on the reverse link. The wired access point is the data source on the forward link and the data sink on the reverse link.

DETAILED DESCRIPTION

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a user device. A user device can also be called a system, a subscriber unit, subscriber station, mobile station, mobile device, remote station, access point, base station, remote terminal, access terminal, handset, host, user terminal, terminal, user agent, data sink, or user equipment. A user device can be a cellular telephone, a cordless telephone, a Session Initiation Protocol (SIP) phone, a wireless local loop (WLL) station, a Personal Digital Assistant (PDA), a handheld device having wireless connection capability, or other processing device(s) connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

With reference now to the drawings, FIG. 1 is a representation of a multi-hop communication system 100 in accordance with the various embodiments disclosed herein. The circular items 102-116 represent access point nodes connected (e.g., wirelessly) in a tree like configuration and the square items 118-134 represent access terminals or end devices. As illustrated, access point or root node 102 is the only wired access point and may be wired to the Internet, for example. The other access points 104-116 may be wireless. Access point 108 is the parent of access terminals 118 and 120, which are the children of access point 108. Similarly, access point 110 is the parent of access terminal 122 and access point 112 is the parent of access terminals 124, 126, and 128. Moving up the tree, access point 104 is the parent of access points 108, 110, and, 112, which are considered children of access point 104. At the top of the tree, root node 102 is the parent of access points 104 and 106, which are its children. Access point 106 is the parent of children access points 114 (whose children are terminals 130 and 132) and 116 (whose child is terminal 134).

It should be understood that in the tree, nodes 104 and 106 are shown as parent nodes, but they can also be in communication with access terminals. For example, access point 104 can be in communication with access point 108-112 and also an access terminal (not shown) at substantially the same time. In such a manner, the access terminal is in direct communication with access point 104. It should also be understood that some or all of the access points or nodes can be access terminals that serve as relay nodes for other terminals. Thus, the configuration illustrated is for example purposes only and is not intended to limit the disclosed subject matter to the illustrated configuration.

A forward link is established if the source of the communication or packet is root node 102 and the receivers or sinks (data sinks) of information are one or more access terminal 118-134. A reverse link is established if one or more access terminal 118-134 is the source of information and the intended recipient is root node 102. Leaf nodes, as used herein, refer to those nodes 108-116 that directly transmit to the data sinks or access terminals 118-134 and to no other access point on the forward link.

A flow as used herein refers to a communication between root node 102 and each access terminal 118-134, which can be either a forward link communication or a reverse link communication. However, the forward link and reverse link flows will be treated as two separate flows in this description. The forward link will be described with reference to determining how fractions of time should be assigned to achieve a certain throughput. The reverse link will be described with reference to determining the fractions of time each child node should be scheduled for the assignment of powers.

System 100 includes nine access terminals 118-134; thus, there are nine possible flows between root node 102 and access terminals 118-134. System 100 should be configured to ensure a fair sharing of resources across all nine flows. The focus is on "maxmin" throughput fairness over the flows. Maxmin utilized herein refers to maximizing the minimum throughput amongst all the flows.

As illustrated, a flow from a source (sender of information) to data sink (or recipient of information) can traverse three hops. For example, if the source is root node 102 and the intended recipient or sink is access terminal 126 (forward link), the communication traverses to access node 104, then to access node 112, then to sink or access terminal 126. The flows from root node 102 to the other access terminals (data sinks) 118-134 traverse through three hops in a similar manner. For a reverse link (e.g., from access terminal(s) 118-134 to root node 102), the communication traverses in an order that is reverse than that traveled for a forward link. It should be understood that a multi-hop wireless network could have more or fewer hops than those shown and described and that different access terminals may have a different number of hops.

In the detailed description, various aspects and embodiments may be described in the context of a Code Division Multiple Access (CDMA) system. In particular, the aspects of a CDMA system utilized are universal frequency reuse (e.g., all nodes use all available bandwidth simultaneously without any static partitioning) and, for explanation purposes, a rate-controlled forward link and power controlled reverse link similar to EVDO CDMA systems. However, rate control and power control concepts for existing CDMA systems have been developed for single-hop scenarios only. While these inventive aspects may be well suited for use with the disclosed embodiments, those skilled in the art will readily appreciate that these inventive aspects are likewise applicable for use in various other systems. Accordingly, any reference to CDMA is intended only to illustrate the inventive aspects, with the understanding that such inventive aspects have a wide range of applications.

Scheduling within system 100 can be determined based on rate controlled scheduling (e.g., fraction of time scheduled) and/or power controlled scheduling (e.g., power of transmission). For exemplary purposes, a CDMA network with forward link transmissions from each node will be assumed at full power with the fraction of time being the resource controlled to ensure fairness. An implicit assumption on the forward link is that each node schedules only one child node for reception at any given time (e.g., pure Time Division Multiplex (TDM)). For exemplary purposes, the reverse link could be assumed to be power controlled allowing for simultaneous receptions from many transmitters to one receiver. However, it should be understood that both rate controlled scheduling and power controlled scheduling can be utilized for either or both a forward link communication and a reverse link communication.

In addition, for illustrations purposes, an Equal Grade of Service (EGoS) scheduling discipline is followed. In EGoS scheduling, the goal is to provide all flows the same throughput unless the throughput for one or more flows may be improved without reducing the throughput for any other flows. In addition to EGoS, other fairness metrics such as weighted grade of service and proportional fairness may be implemented.

The following notations will be utilized in the following discussion for sender-based scheduling or rate control. $M_i$ is the number of access terminals (data sinks) associated with AP i (Access Point i). $U_i$ is the common throughput of access terminals (data sinks) associated with AP i. $R_i$ is the instantaneous transmission rate to a node (Access Point or Access Terminal) i from its parent. The fraction of time that node i is scheduled by its parent, node j, is represented as $f_i^j$. The respective notations are illustrated in FIG. 1.

Figure 2:
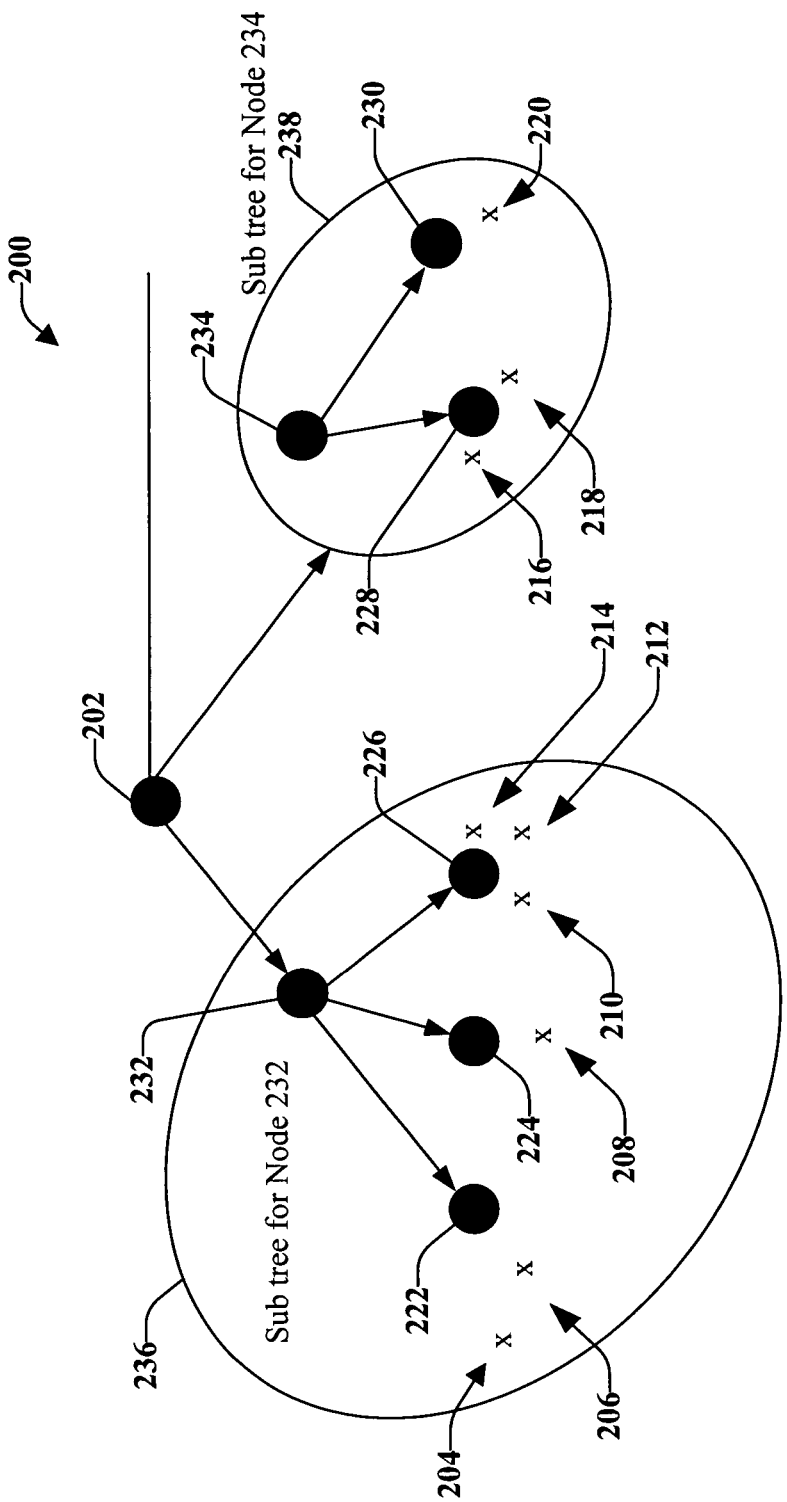
FIG. 2 illustrates a representation of a forward link communication.

FIG. 2 illustrates a forward link communication 200. Data flows from the root node 202 to the access terminals 204, 206, 208, 210, 212, 214, 216, 218, and 220. The access terminals 204-220 are data sinks. The wired access point 202 is the data source. Nodes 222, 224, 226, 228, and 230 are leaf nodes that directly communicate with the access terminals 204-220. It should be understood that access terminals could also communicate with node 232, however, the definition of a leaf node, as used herein, is that a leaf node only communicates with access terminals on the forward link. For example, on the forward link, node 222 is sending data to the access terminals, not to another access point. Thus, node 232 is considered a parent node that is sending data to nodes 222, 224, and 226 (who are child nodes of node 232).

A sub-tree for Node 232 is illustrated at 236, which is all the nodes and terminals under node 232. Assuming node 232 is a root and descending the tree, everything under it is considered to be a sub-tree. Likewise, the sub-tree for node 234 is shown at 238.

Figure 3:
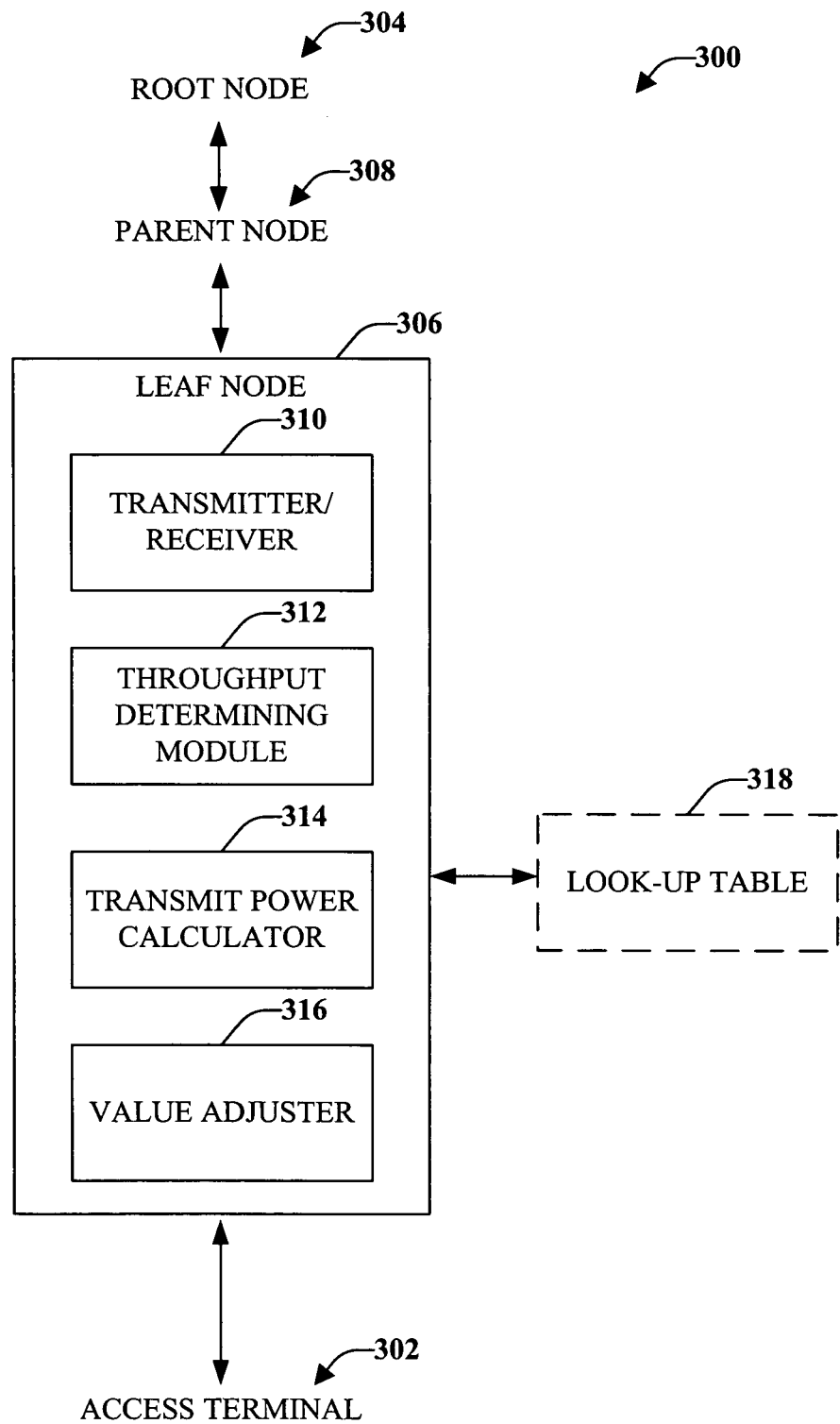
FIG. 3 illustrates a wireless communication system that utilizes fair scheduling techniques.

FIG. 3 illustrates a wireless communication system 300 that utilizes fair scheduling techniques. System 300 includes one or more access terminals 302 that can communicate (e.g., communicatively coupled) with a root node 304 through one or more leaf nodes 306 (e.g., node that directly communicates with access terminal 302) and one or more parent nodes 308. Access terminal 302 can be a data sink or a data source depending on the communication flow. System 300 can be coupled in a tree-like configuration similar to the configuration shown and described with reference to the above figures. It should be understood that while the illustrated communication route includes three hops, in some embodiments the communication route can include more or fewer hops between access terminal(s) 302 and root node 304. For example, access terminal 302 can communicate directly with root node 304 or access terminal 302 can communicate with root node 304 through a single leaf node 306.

Leaf node 306 can include a transmitter/receiver 310 that can be configured to receive data from, and send data to, its children (e.g., access terminal(s) 302) and/or its parent node 308). For rate-controlled multi-hop scheduling, the information can include the number of access terminals 302 under leaf node 306 and a throughput achievable for each access terminal 302, or the product of this information. For power controlled multi-hop scheduling, the information can include the transmit power needed by access terminal(s) 302 under leaf node 306.

Leaf node 306 can also include a throughput determining module 312 that can be configured to determine the throughput leaf node 306 is able to provide to access terminal(s) 302 under it. For example, throughput determining module 312 can establish or determine a sustainable "maxmin" throughput per access terminal 302. Where M is the number of access terminals, the "maxmin" calculation can be expressed as:

$$U = \frac{1}{\sum_{j=1}^{M} 1/R_j}$$

The corresponding fraction of time that each access terminal 302 should be served can be expressed as:

$$f_j = \frac{1/R_j}{\sum_{k=1}^{M} 1/R_k}$$

For a power controlled multi-hop scheduling determination, leaf node 306 can include a transmit power calculator 314 that can be configured to calculate the transmit power needed by access terminal(s) under it. As illustrated, the receiver can calculate a transmit power associated with each child node based on a determined throughput. However, in some embodiments, the receiver determines a receive power associated with each child node based on a determined throughput. The receiver can reiteratively (e.g., through up/down commands) cause the transmitter to change its transmit power. Thus, achieving the desired receive power. It should be noted that receive power is the transmit power times the channel gain. A carrier-to-interference (C/I) ratio is the ratio of the amplitude of a radio frequency carrier to the amplitude of interference. The C/I ratio, as measured at the receiver, is a function of the receive power. Thus, the receiver can control its C/I ratio by controlling its receive power.

The information from throughput determining module 312 (for rate controlled scheduling) and/or transmit power calculator 314 (for power controlled scheduling) is communicated to the parent node 308 or, in some embodiments to root node 304. Flow based fair scheduling is calculated and repeated for each node ascending (or propagating up) the tree until the root node 304 is reached. Further details regarding the flow based fair scheduling are provided below.

Leaf node 306 can also include a value adjuster 316 that can be configured to adjust various parameters based on the flow based scheduling determined by each node ascending the tree and whether any ascending node is an obstruction within system 300. For example, the scheduling time fraction may by modified if the total throughput leaf node 306 can deliver to its child (e.g., access terminal 302) is not sustainable by its parent (e.g., parent node 308) and/or root node 304. In some embodiments, each node may desire to know the sustainable throughput calculated for access terminals under its sub-tree so that the node can re-compute its time fractions.

For example, consider the forward link from root node 304 to access terminal 302. Leaf node 306 can calculate a throughput to its access terminals, including access terminal 302, but either parent node 308 or root node 304 might determine that it can only support a lower value. Node 306 may wish to know this information and adjust its fractions accordingly, thus, root node 304 or parent node 308 can communicate this information to node 306. In some embodiments, this information may be determined implicitly by node 306 through observing the slower rate at which it receives data from its parent node (e.g., node 308). Thus, in these embodiments, root node 304 and parent node 308 do not need to convey the throughput information to node 306.

The rate may also be modified based on other factors in order to provide flow based fair scheduling throughout system 300. Value adjuster 316 may also adjust the target throughput available to each access terminal 302 and thereby the required transmit power from the terminal if an ascending node (e.g., parent node 308, root node 304) determines that there is a violation of a peak power constraint and/or a rise-over-thermal constraint. In this example, data flow is from access terminal to the root node. An intermediate node (e.g., parent node 308) might need to know if there is a bottleneck upstream and slow down the throughput it is receiving from its children accordingly. Slowing down of throughput translates into adjusting the previously computed or converged upon transmit or receive power.

Leaf node 306 can also be associated with a look-up table 318. Access terminal 302 can provide leaf node 306 feed back channel quality information (e.g., signal-to-noise ratio). This channel quality information can be mapped, by leaf node 306, to a rate included in look up table 318. The mapped rate is the rate it can give its children. This rate can be stored in look-up table 318 for later retrieval purposes.

Transmitter, receiver, or both may include, but are not limited to, communication interface components such as a serial port, a universal serial bus (USB), a parallel port, and wired and/or air interface components for implementing communication protocols/standards such as World Interoperability for Microwave Access (WiMAX), infrared protocols such as Infrared Data Association (IrDA), short-range wireless protocols/technologies, Bluetooth® technology, ZigBee® protocol, ultra wide band (UWB) protocol, home radio frequency (HomeRF), shared wireless access protocol (SWAP), wideband technology such as a wireless Ethernet compatibility alliance (WECA), wireless fidelity alliance (Wi-Fi Alliance), 802.11 network technology, public switched telephone network technology, public heterogeneous communications network technology such as the Internet, private wireless communications network, land mobile radio network, code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple access (OFDMA), global system for mobile communications (GSM), single carrier (1X) radio transmission technology (RTT), evolution data only (EV-DO) technology, general packet radio service (GPRS), enhanced data GSM environment (EDGE), high speed downlink data packet access (HSPDA), analog and digital satellite systems, and any other technologies/protocols that may be used in at least one of a wireless communications network and a data communications network.

Figure 4:
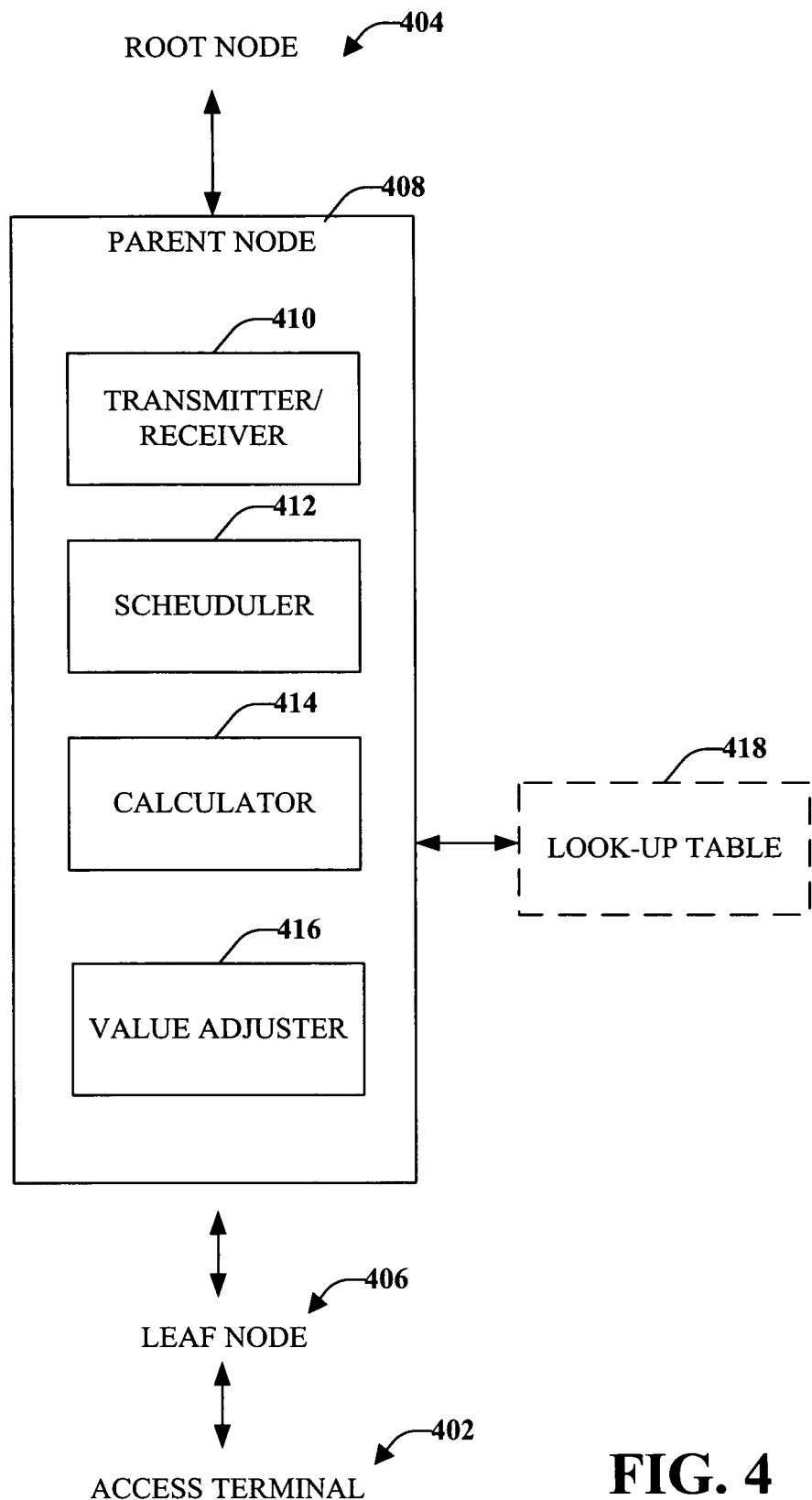
FIG. 4 illustrates another embodiment of a system that provides flow based fair scheduling.

With reference now to FIG. 4, illustrated is another embodiment of a system 400 that provides flow based fair scheduling. System 400 is similar to the systems described in conjunction with the preceding figures. System 400 includes one or more access terminal 402 that can communicate with a root node 404. The communication between access terminal 402 and root node 404 can be conducted by utilizing multi-hop topology wherein the communication is transferred through various access points or hops and can be in a tree configuration. As illustrated, communication within system 400 can be transferred through three hops (from access terminal to a leaf node 406, then to a parent node 408, and then to root node 404), for a reverse link. For a forward link communication, the communication would originate at the root node 404 and the intended destination is the access terminal 402. System 400 can be configured to provide flow based fair scheduling among all flows or paths between root node 404 and one or more access terminal 402. It should be understood that system 400 can include more than one access terminal 402, leaf node 406, and/or parent node 408 and, for example, can be in a configuration similar to that shown in FIG. 1. In accordance with some embodiments, root node 404 communicates directly with access terminal 402.

While FIG. 4 is described with reference to parent node 408, it can equally apply to root node 404. That is to say, root node 404 includes similar elements, functionalities, or both as that described below with reference to parent node 408. In addition, in the following description, some elements are applicable to rate-control and some elements are applicable to power-control.

Parent node 408 can include a transmitter/receiver 410 that can be configured to receive from its child node(s) (e.g., leaf node(s) 406) information regarding the number of access terminal(s) 402 under leaf node 406 and a throughput rate leaf node 406 is able to give the access terminal(s) 402 under leaf node (or a product of the number of access terminals and throughput rates). Transmitter/receiver 410 can also be configured to receive from its children (e.g. leaf node(s) 406 under it) a calculated transmit power needed by the access terminal(s) 402 under respective leaf node(s) 406.

Parent node 408 includes a scheduler 412 and a calculator 414 that can individually determine whether parent node 408 is an obstruction. During rate controlled multi-hop scheduling, scheduler 412 receives the number of children and throughput information for each leaf node 406 under parent node 408. The fraction of time each leaf node 406 needs to be scheduled to meet its throughput requirements is determined and the sum of all fractions of times for all leaf nodes 406 under parent node 408 is determined. If the sum of all fractions of time is less than or equal to one, parent node 408 is not an obstruction. Information regarding the number of leaf nodes 406 under parent node 408 and respective throughput information can be sent to the next ascending node in the tree (e.g., root node 404). Thus, the information can be propagated up the tree until the information is received by root node 404.

If the sum of all fractions of time is more than one, parent node 408 is an obstruction and the best common throughput that it can support for its children may be determined. Such a determination can include identifying the child node (e.g., leaf node 406) whose data sinks (e.g., access terminals 402) need the lowest throughput. This lowest throughput is associated with all child nodes and the fractions of time for the all child nodes is calculated (using this lowest throughput value) to determine if the sum is less than or equal to one. If the throughput is still greater than one, the throughput is adjusted downward by value adjuster 416 until the sum of the throughputs is less than or equal to one. If the sum is less than one, the child nodes whose data sinks requested a higher throughput can be given spare capacity utilizing a maxmin fairness concept, which will be discussed in further detail below. Thus value adjuster 416 can selectively adjust the determined fraction of time to schedule the at least one child node depending on the needs of the data sinks.

Parent node 408 can be associated with a look-up table 418 that can be information stored in parent node 408 or accessible by parent node 408. Look-up table 418 can be configured to provide parent node 408 with a value to give its children by mapping throughput to signal-to-noise ratio offline and can store these values in look-up table 418.

For power control scheduling, calculator 414 can be configured to determine if the transmit power requested by each child node meets a C/I ratio. Such a determination can be based on the number of children and the throughput to each child. According to some embodiments, this determination can be performed by obtaining a threshold value and mapping that value to a desired C/I value. The C/I value can be stored in the look-up table 418, for example, and can be found by locating the throughput. Once the C/I value is determined, the power control problem can be solved to determine the transmit (or receive) power that will achieve the C/I value.

In accordance with some embodiments, information can be obtained periodically concerning available headroom to peak transmit power from all the children. There are two constraints that should be considered, which are the maximum transmit power of the children and the ratio of the total received power at the parent normalized by the thermal noise power, which is a quantity referred to as Rise-Over-Thermal (ROT). The peak power limit is associated with a transmit power and is from the child nodes because they are data sources (e.g., transmitters) in the reverse link. The ROT level or constraint is determined by the receiver or parent node and is associated with a total receive power. ROT can be used to maintain the received power within an allowed dynamic range of the receiver and for overall stability of the power control loops in all cells. If neither the ROT threshold value nor the peak power limit is being reached, the parent node 408 can automatically apportion reverse link capacity according to the needs of the nodes under the parent node 408.

If the ROT threshold is met and/or if the peak power limits are being reached, parent node 408 may request, through transmitter/receiver 410, each leaf node 406 under it to lower its rate with a rate calculated in a "maxmin" fair manner. This calculation can be performed iteratively. For example, the rates can be lowered in steps or increments until a fair, sustainable throughput to each child under it is achieved. For example, if a node has two children, one having five data sources (or access terminals) under it and the other having two data sources under it, parent node can request each child to lower its rate until a sustainable throughput in the ratio 5:2 is achieved. If the resulting throughput is higher than the originally requested throughput for any of the sinks, after assigning that capacity, the spare capacity can be given to the other children while maintaining the proportion.

It should be noted that the process for determining scheduling for either rate controlled scheduling or power controlled scheduling is determined first by leaf node(s) 406 and ascending up the tree until the root node 404 is reached. The root node 404 it can determine or compute the sustainable throughput for data sinks (access terminals 402) in the tree.

In some embodiments, the root node 404 determines the final throughput value and communicates the determined value to its child nodes. Each child node can adjust its respective scheduling time fractions, as appropriate, based on the final threshold value received from root node 404. The time scale over which the fractions are met can depend on the application and the rate at which the channel changes.

In accordance with some embodiments, the nodes can scale back the total throughput they receive from respective child nodes if such node(s) is not able to obtain the same throughput to its parent. In some embodiments, the parent may ask one or more children to slow down the rate.

The approaches shown and described herein can also be utilized for scheduling wherein each time a power control problem is solved, a subset of children transmit to the parent. This can be accommodated by including those actually transmitting in solving the power control equation(s). For example, a reasonable scheduling policy can utilize the smallest subset that allows the parent to use the reverse link capacity (e.g., allowed ROT) to its fullest, subject to packet latency constraints, and change the scheduled subset in time.

In addition or alternatively, flow control can be utilized as a mechanism for maintaining a measure of fairness. Assuming an equal grade of service per flow fairness, a transmitter can send an equal rate on all of its children's flows. The child can use a metric, such as an average queue size for transmitting the data to the next hop, to signal flow control to the transmitter. The flow control may be an on/off mechanism or a signal to reduce or increase the rate. For example, a queue size can be analyzed to compute a moving average and a first threshold can be utilized to slow down the rate while a second threshold is utilized to switch off the flow. The same thresholds, or different thresholds, can be used to switch on the flow and/or increase the rate of the flow.

In view of the exemplary systems shown and described above, methodologies that may be implemented in accordance with the disclosed subject matter will be better appreciated with reference to the flow charts of FIGS. 5-8. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means such as device, system, process, and component. Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 5:
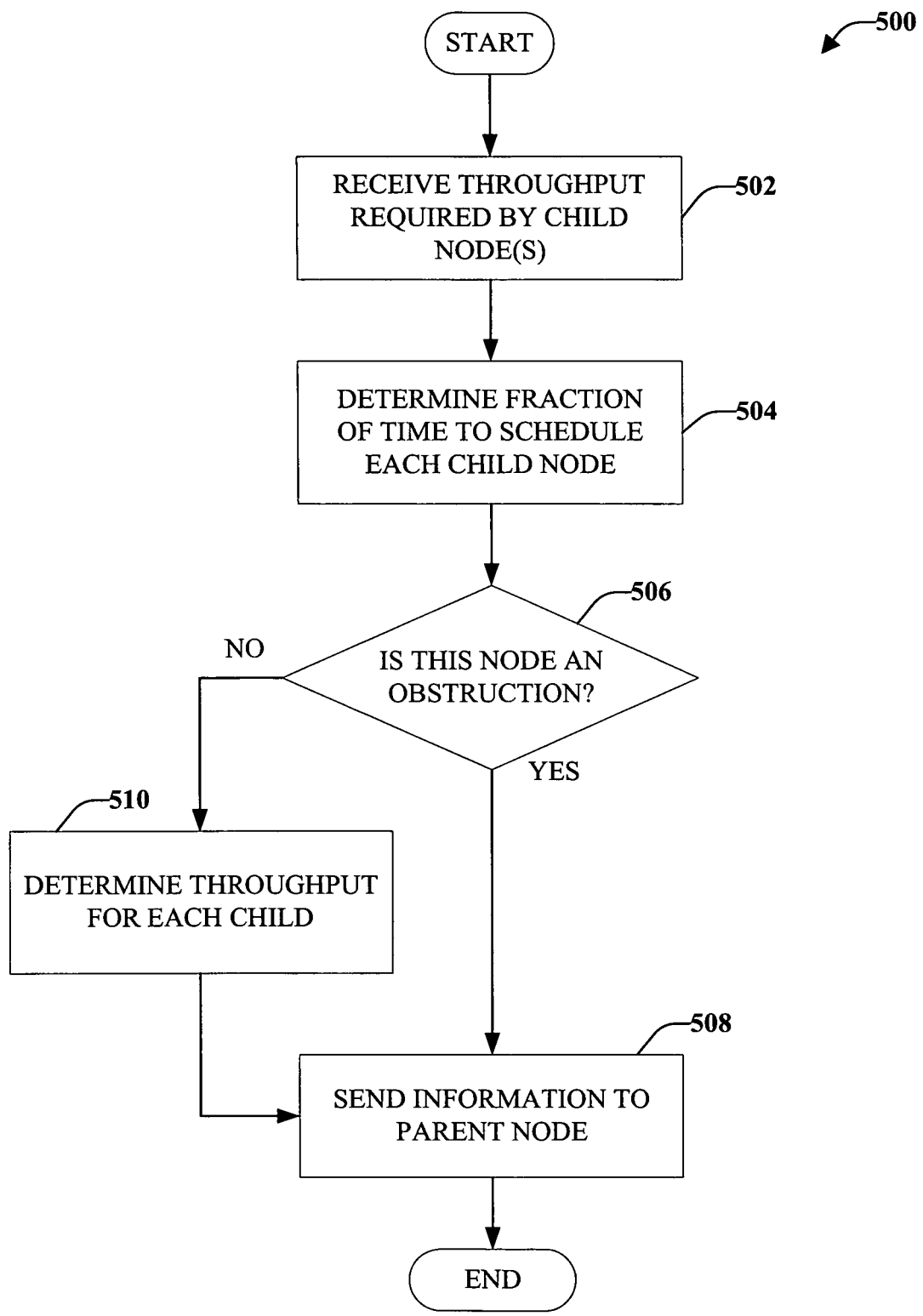
FIG. 5 illustrates a flow chart of a methodology for supporting data communications through rate controlled multi-hop scheduling.

FIG. 5 illustrates a flow chart of a methodology 500 for supporting data communications, such as through rate controlled multi-hop scheduling where each transmitter transmits at full power while controlling the time fraction it transmits to each of its children. The focus is to maximize the minimum flow throughput $U_j$, that can be sustained within the tree. The instantaneous rates $\{R_i\}$ and association of nodes within the tree is assumed to be fixed. Furthermore, each parent node is assumed to know the instantaneous rate to each of its children. This may be accomplished, for example, through periodic rate feedback from the children. The time fraction that each access point transmits to each of its children is controlled.

The method 500 starts at 502, where a particular node (e.g., parent node, root node) receives the throughput specification (e.g., requirement) of its child nodes(s), which are communicatively coupled to the parent (or root) node. This information can be requested from the child nodes or the child nodes can automatically send the information. The throughput specification can be a desired throughput per data sink associated with each child node. At 504, a fraction of time to schedule each child is determined for allowing each child node to have its specified throughput. This determination can be repeated for each ascending node up to a root node. Such determination can include receiving from each child node j the total number of child nodes $M_j$ and the common throughput $U_j$. The computation for the fraction of time each child should be scheduled to meet its specified throughput can be expressed as:

$$f_j = \frac{M_j U_j}{R_j}$$

In some embodiments, the throughput may be calculated without considering constraints within the network, including the constraints of any parent nodes. The leaf node(s) can give each of its child nodes a similar throughput. However, in accordance with some embodiments, one or more child node can be given a different throughput. Therefore, the throughput can be divided equally or it can be adjusted according to a Quality of Service (QoS) metric, for example. In some embodiments, the throughput of each child node can be calculated utilizing a maxmin fairness concept, which will be discussed in more detail below.

At 506, the node determines if it is a bottleneck or obstruction within the tree. This can be established, for example, based on an equal grade of service throughput of its child nodes and the fraction of time its child nodes need to be scheduled. Such a determination can include deciding if the total time fraction assigned to its child nodes is less than or equal to one or unity, which can be expressed as:

$$\sum_j f_j \leq 1$$

If it is determined that the total time fraction is less than or equal to unity ("YES"), the node for which the equation was performed is not an obstruction and the vector of the M and U values of its child node(s) are passed up to its parent node, at 508. It should be noted that in accordance with some embodiments the products of the U values and the M values are conveyed to the parent. This can be important if the leaf nodes use a non-EGoS throughput assignment to the access terminals.

If the determination at 506 is that the total time fraction is more than one ("NO"), the node is an obstruction and the best common throughput that the node can support for all child nodes under itself in the tree is determined utilizing, for example, a maxmin fairness concept, at 510, which will be discussed in detail with reference to FIG. 6. The determination whether this node is an obstruction can be repeated for each ascending node up to a root node. After determining the throughput for each child, the information is sent to the parent node, at 508. If the node determining the throughput for each child is the root node, the information is not sent to a parent node, at 508.

The method 500 can be repeated with the next ascending node in the tree calculating the scheduling time of its child nodes. It is to be understood that this act can be recursive such that any number of ascending nodes can calculate the scheduling time of its child node(s) and determine whether it is an obstruction until a root node (wired node or data source) is reached. The root node can determine a scheduling policy based on the time fractions calculated, at 510. This scheduling policy can be implemented without notifying the child nodes of the policy or, in accordance with some embodiments, the root node can send the scheduling policy information to its child nodes. Moreover, it is to be appreciated that automated and/or dynamic calculation of scheduling time can be employed in connection with some embodiments.

Figure 6:
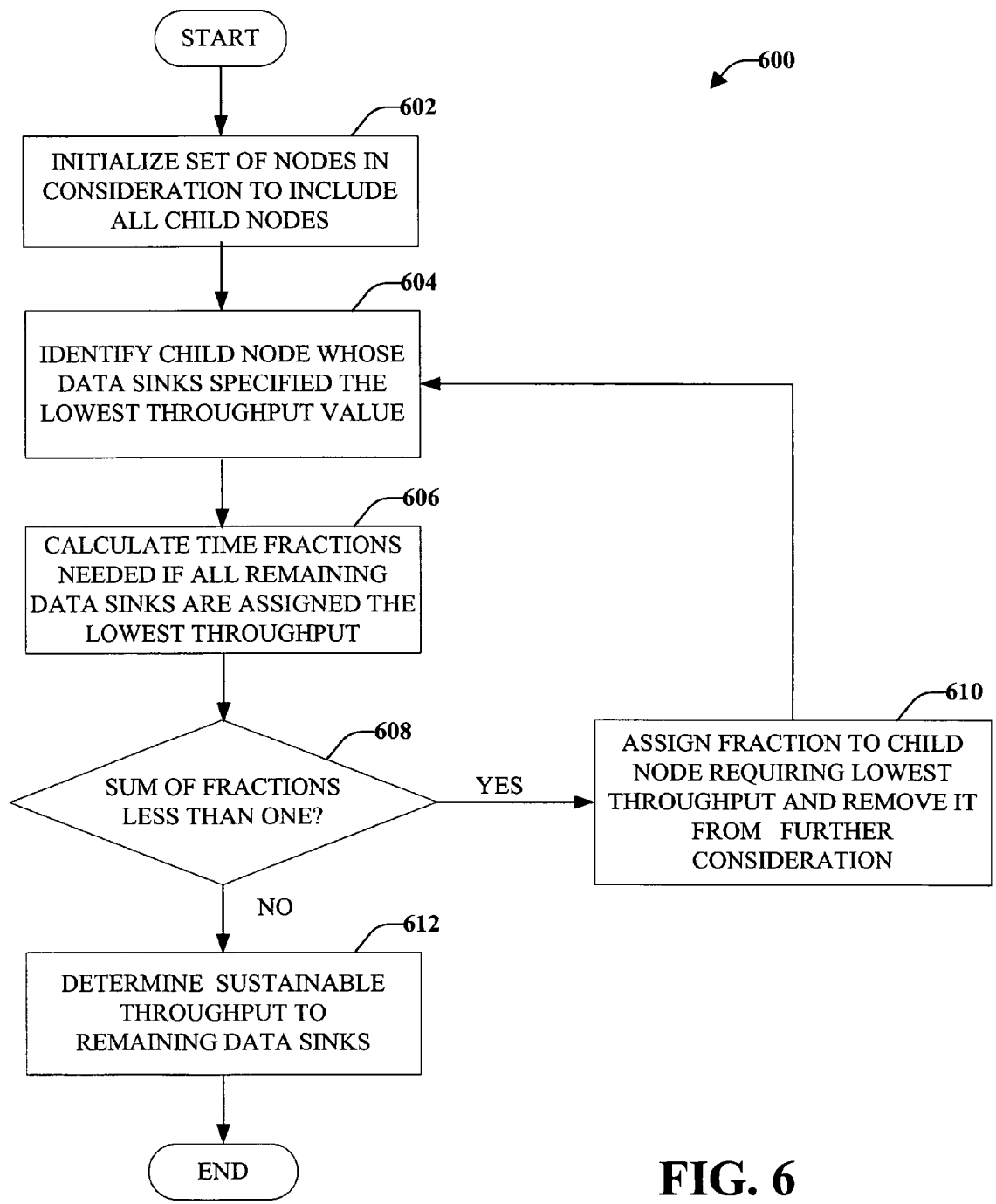
FIG. 6 illustrates a flow chart of a methodology for determining throughput based on a maximum fairness concept.

Referring now to FIG. 6, illustrated is a flow chart of a methodology 600 for determining throughput based on a maxmin fairness concept. If a node is determined to be an obstruction in a network, it cannot meet the specified throughput of its child node(s) and, therefore, should determine the best throughput it can provide to its child nodes, which can be determined utilizing a maxmin fairness concept.

At 602, an assignment set of nodes in consideration is initialized to include all child nodes under the node performing the analysis (e.g., obstruction node). This can include initializing the assignment set to be equal to $\{M_j, U_j\}$. The child node under the obstruction node whose data sinks specified or need the lowest throughput value is identified, at 604. The child node can be identified where $\tilde{U}$ is equal to min $U_j$ and $\tilde{C}$ is equal to arg min $U_j$. That is, $\tilde{C}$ is the child node whose sub-tree has data sinks requesting the lowest throughput value for all child nodes under the obstruction node. This information can be stored, recorded, maintained, etc. in a processor, memory, or storage media, the information should be in retrievable format.

At 606, the remaining data sinks under the obstruction mode are temporarily assigned or associated with the lowest throughput value (determined at 604) and the time fractions needed is calculated based on all data sinks having the same lowest throughput value. The equation for this can be expressed as:

$$f_j = \frac{M_j \tilde{U}}{R_j}$$

At 608, a determination is made whether the sum of the fractions of time is less than unity or one. If it is less than one ("YES"), it indicates that after assigning the identified lowest throughput value $\tilde{U}$ to all data sinks under this obstruction node, there is spare capacity remaining that can be distributed among the other data sinks that have a higher throughput requirement. At 610, the identified lowest throughput is assigned to the child nodes whose data sinks specified the lowest throughput (as determined at 604) and that child node is removed from further consideration. Method 600 can return to 604, where the remaining child nodes under consideration (under the child node) are analyzed to determine the next child node whose data sinks need a higher throughput than the identified lowest throughput or specified the next lowest throughput value. Method can continue in a similar manner for the other child nodes until the determination, at 608, is "NO", the sum of fractions is more than one.

If the determination, at 608, is that the sum of the fractions of time is more than one ("NO"), it indicates that $\tilde{U}$ cannot be supported for all child nodes under the obstruction node. The method 600 continues at 612, where a sustainable fraction value for the remaining child nodes is determined. This should be determined in such a manner that the sum of the fractions of time is not more than one or unity. The calculation can take the following format:

$$\tilde{\tilde{U}} = \frac{1}{\sum_j M_j / R_j}$$

The time fraction that each child is scheduled to achieve the sustainable throughput, at 612, can be expressed as $$f_j = M_j \tilde{U} / R_j.$$

The vector or M and $$\tilde{U}$$

is passed from the obstruction node to its parent. It should be noted that the value of M may be communicated to the parent only when there is a change in its value.

For example, a parent node has two children (child node 1 and child node 2). Child node 1 has five access terminals that specified a throughput of one and child node 2 has three access terminals that specified a throughput of two. Assume that parent node cannot find fractions of time summing to less than or equal to one based on these specified values. Parent node first assigns all eight access terminals the throughput of one (which is the lowest throughput) and makes a determination whether it can support this value. If it can support that value for all eight access terminals, the throughput value of one is assigned to the access terminals under child node 1 (e.g., the data sinks under child node 1 receive their specified throughput). Next parent node determines what value (between one and two) it can give to the access terminals under node 2. In such a manner the access terminals under node 2 do not get the throughput value specified, but they get the best throughput available utilizing a maxmin fairness manner.

To further illustrate, the following discussion is provided with reference again to FIG. 2. In particular, this discussion will focus on the sub-tree 236 for node 232. Suppose that among all the data sinks 204, 206, 208, 210, 212, and 214 in this sub-tree 236, data sinks 204 and 206 specified the lowest throughput. For simplicity, assume that data sinks under a common leaf node have the same throughput. Each of the nodes 222, 224, and 226 communicate their throughput needed to node 232, which then computes the fraction of time it should schedule each of the nodes 222, 224, 226 in order to meet those requirements. If the fractions sum to a value greater than unity, node 232 determines if it can support the lowest throughput, namely that of data sinks 204 and 206, for all data sinks 204-214. If the fractions sum to less than unity, then it assigns the requisite throughput to data sinks 204 and 206, determines the fraction of time to schedule node 222 and continues to determine if it can do better for nodes 224 and 226. To do so, it chooses the smaller of the data sink throughputs from 208, 210, 212, and 214. Assuming 208 needs a smaller throughput than 210, 212, or 214, node 232 attempts to assign the throughput of 208 to all remaining data sinks (208, 210, 212, and 214). If node 232 still has capacity to spare after this assignment, it assigns the remaining capacity to 210, 212, and 214. If there is no spare capacity, node 232 finds a common throughput for data sinks 208, 210, 212, and 214 such that its fractions of time sum to unity.

Unequal target throughputs in the tree can be accommodated by associating weights to the number of users (e.g., data sinks) when determining the sustainable throughput to children. For example, a node has two children with $M_1$ and $M_2$ data sinks, rates $R_1$ and $R_2$ and the parent node desires to provide $w_1$ times more throughput to data sinks on child 1 compared to child 2. This can be obtained by solving $f_1 = w_1 M_1 U/R_1$, $f_2 = M_2 U/R_2$ and $f_1 + f_2 = 1$. A similar approach can be utilized for the power control case described below.

h illustrates a flow chart of a methodology 700 for supporting data communications such as through power controlled multi-hop scheduling. In the following detailed description for illustration purposes, the reverse link will be described and it should be assumed that all children transmit simultaneously to their parent and are power controlled by the parent. There are two constraints that should be considered, which are the maximum transmit power of the children and the ratio of the total received power at the parent normalized by the thermal noise power, which is a quantity referred to as Rise-Over-Thermal (ROT). The peak power limit or constraint is associated with the child nodes because they are data sources (e.g., transmitters) in the reverse link. The ROT level or constraint is determined by or associated with the receiver or parent and is associated with the total receive power. ROT is a well-known metric for CDMA systems and is used to help ensure that the received power is within the allowed dynamic range of the receiver and for overall stability of the power control loops in all cells.

Before describing the methodology 700 in detail, the setup and solution of the basic power control problem will be presented. Consider a node with K children, channel gains given by $\vec{h} = [h_1 \; h_2 \; \ldots \; h_k]$, transmit powers $\vec{p} = [p_1 \; p_2 \; \ldots \; p_k]$, other cell interference power Ioc and thermal noise power N. It should be understood that while thermal noise power may stay fairly constant over a long period of time, the Ioc can vary over shorter time scales. This faster variance can occur because users in other cells may be adapting their powers at substantially the same time. Even through the power control problem and its solution are described herein in terms of a linear system of equations, in some embodiments there are individual and independent power control loops to each transmitter. The ROT constraint attempts to ensure system wide stability of those loops and the loops may converge to a solution substantially similar to the analytic one described herein. Therefore, mechanisms other than those shown and described can be utilized to accomplish power control.

If a mapping function from rate to target carrier-to-interference (C/I) is known at each node, given a requested rate from a child, the parent can compute the required C/I ratio, denoted by $\vec{\gamma} = [\gamma_1 \; \gamma_2 \; \ldots \; \gamma_k]$. In CDMA systems, for example, this may be accomplished by the use of an "outer loop" power control wherein the C/I target is raised or lowered based on frame/bit error rate performance. The goal is to compute powers $\vec{p} = [p_1 \; p_2 \; \ldots \; p_k]$, so that each user achieves its target C/I while meeting the peak power and ROT constraints. The solutions can be obtained by solving the following equations:

$$H\vec{p} = (Ioc + N)\vec{\gamma} \quad \text{where}$$

$$H = \begin{bmatrix} h_1 & -h_2\gamma_1 & \cdots & -h_K\gamma_1 \\ -h_1\gamma_2 & h_2 & \cdots & -h_K\gamma_2 \\ \vdots & \vdots & \ddots & \vdots \\ -h_1\gamma_K & -h_2\gamma_k & \cdots & h_K \end{bmatrix}.$$

subject to the constraints:

$$0 < p_j \leq p_{max} \forall j \quad \text{(Peak Power Constraint)}$$

$$\frac{\vec{h}^T \vec{p} + Ioc + N}{N} \leq r \quad \text{(ROT Constraint)}$$

The power control equation can be solved analytically to yield the power values:

$$p_j = \frac{(I_{oc} + N)}{h_j \xi_j \left(1 - \sum_k 1/\xi_k\right)}.$$

where $$\xi_j = \frac{\gamma_j + 1}{\gamma_j}.$$

If one or both constraints are violated by the computed power values, the requested rates by children, or equivalently, the requested C/I values cannot be sustained. In this situation, the parent can determine a feasible lower set of rates to all children. The sustainable rate to each child can be determined to attain maxmin fairness for each flow, which will be described with reference to FIG. 8.

Figure 7:
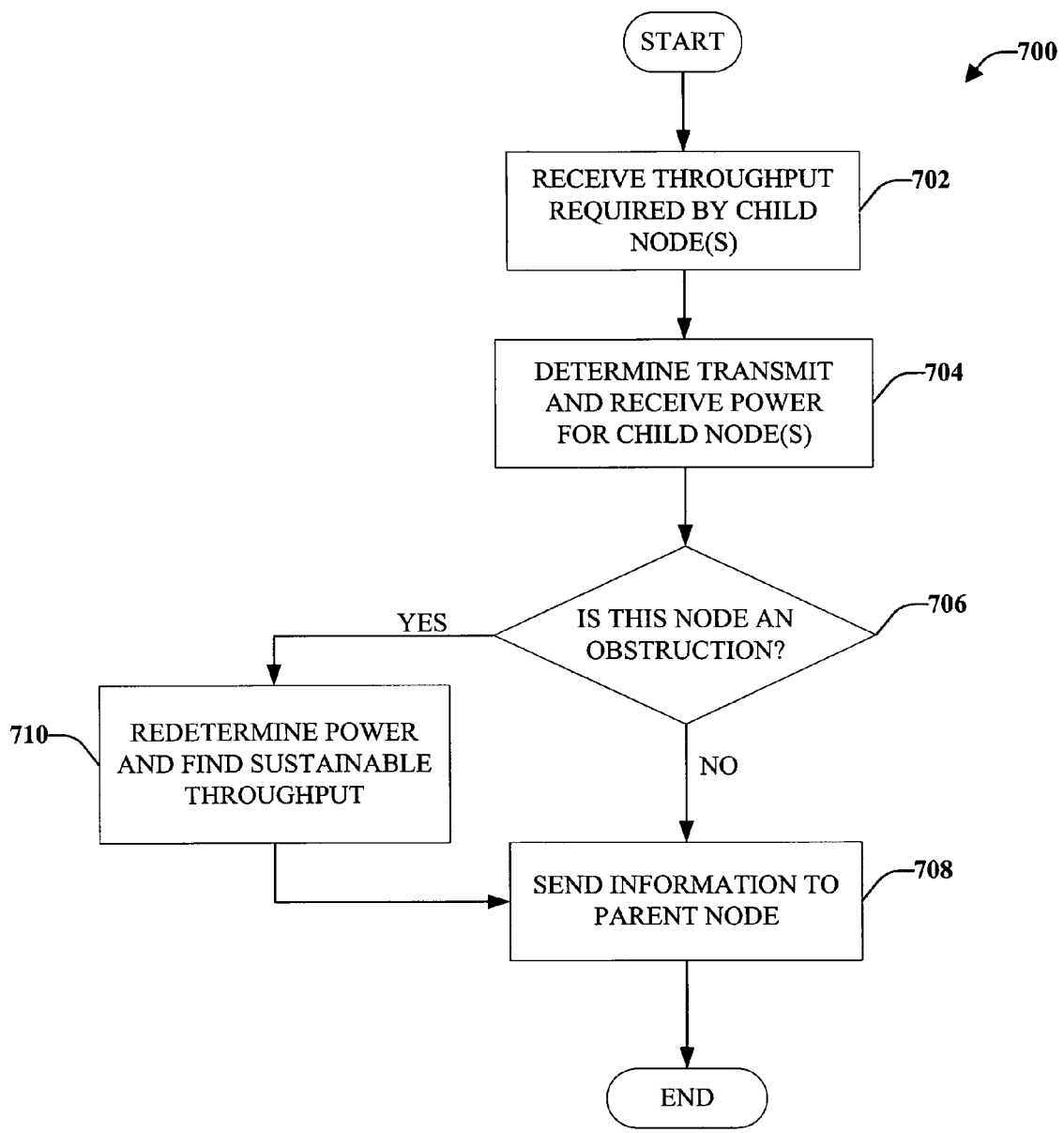
FIG. 7 illustrates a flow chart of a methodology for supporting data communications through power controlled multi-hop scheduling.

Referring now to FIG. 7, at 702, a particular node (e.g., parent node, root node) receives a throughput specified by its child node(s), which are communicatively coupled to the parent (or root) node. The received throughput can be a desired throughput per data sink associated with each child node. At 704, a transmit power and a receive power associated with each child node is determined based, in part, on the received desired throughput information. The determination can include calculating the sustainable throughput by solving the power control problem described earlier. It is assumed that the node has measured the other cell interference power and thermal noise power recently and that these quantities change relatively slowly over time. The C/I that should be available for each child can be calculated using $M_j$ and $U_j$ from each child node j. The total needed rate from each child is $M_j U_j$ which can be used in conjunction with the rate to C/I mapping function to determine the value.

At 706, a determination is made whether this node is an obstruction. Such determination can consider whether constraints are violated. This can be determined by solving the power control problem and evaluating the peak power constraint and the ROT constraint. If this node is not an obstruction (e.g., the constraints are not violated) ("NO"), the method 700 continues, at 708, where the vector (or product) of M and U values of the child node(s) are passed up to the parent node(s). If the constraints are violated ("YES"), the node is considered an obstruction and the method 700 continues, at 710, where the power for each child node is re-determined and the sustainable throughput for each child node is found utilizing, for example, a maxmin fairness concept., which will be discussed in connection with FIG. 8. The information is sent to the parent node, at 704. The parent node, which can be the root node can determine a scheduling policy based on at least one of the determined transmit and receive powers. In some embodiments, the root node communicates scheduling policy information to its child nodes.

Figure 8:
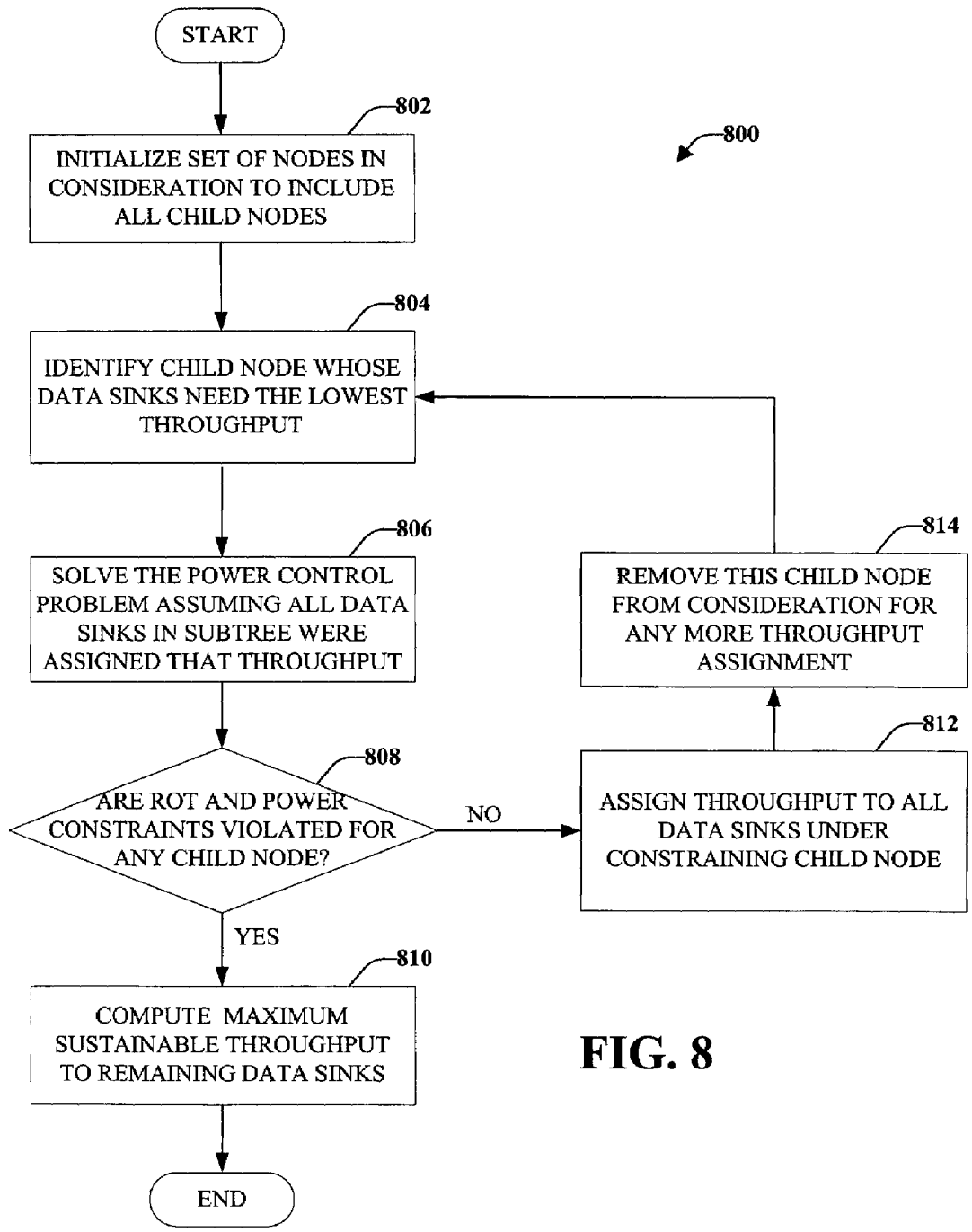
FIG. 8 illustrates a flow chart of a methodology for finding a common throughput for children under an obstruction node.

FIG. 8 illustrates a flow chart of a methodology 800 for finding a common throughput for child node(s) under an obstruction node. The method 800 begins, at 802, by initializing an assignment set of nodes in consideration to include all child nodes under the obstruction node. At 804, the child node, whose data sinks need the lowest throughput among the remaining child nodes under consideration, is identified and its value can be recorded. This can involve initializing an assignment set S to be equal to $\{M_j U_j\}$ containing the requirements of all children, and defining $\tilde{U}$ to be equal to min $U_j$ and $\tilde{C}$ to b equal to arg min $U_j$. The value can be recorded, stored, maintained, or the like in a retrievable format. The power control problem can be solved, at 806, with the assumption that all data sinks in the sub-tree were assigned the lowest throughput value (as determined at 804).

A determination is made, at 808, whether the ROT constraint, the power constraint, or both are violated for any child node. If the constraints are violated ("YES"), the minimum data sink throughput is not sustainable, and the method continues at 810, where the maxmin sustainable throughput to remaining data sinks is computed so that the constraints are met. This can involve solving the two constraint equations, discussed above, and choosing the smaller of the two values. Both constraints are non-decreasing in the user throughput (assuming that the C/I to rate mapping is non-decreasing). Choosing the smaller of the solved values can help ensure feasibility. If the child node does not meet the peak power constraint and the parent node ROT constraint, the power for each child can be re-determined until the largest sustainable data sink throughput is determined.

If the determination, at 808, is that the constraints are not violated, or they are not violated with strict inequality ("NO") then the minimum throughput is assigned to all data sinks in the tree under the constraining child node, at 812. This child node is removed from consideration for any further throughput assignment, at 814.

The method 800 continues, at 804, where the remaining child nodes under consideration are analyzed to determine the child node whose data sinks need the lowest throughput. The method 800 can continue in substantially the same manner until all child nodes are assigned a throughput value.

Figure 9:
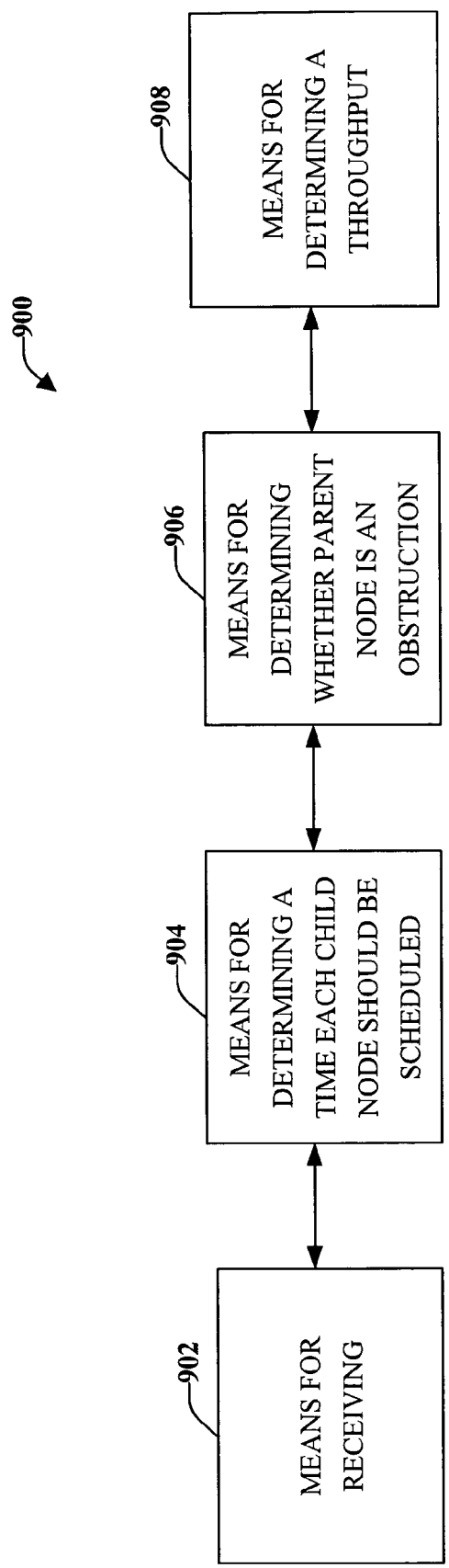
FIG. 9 is system for supporting data communications in multi-hop wireless networks from the perspective of a parent node.

FIG. 9 is system for supporting data communications in multi-hop wireless networks from the perspective of a parent node. It should be understood that the systems that will be described with reference to FIGS. 9 through 12 are represented as functional blocks, which can be functional blocks that represent functions implemented by a processor, software or combination thereof.

System 900 can be implemented in a wireless device and can include a means for receiving 902 that can be configured to receive a desired throughput per data sink associated with each child node. The child node is communicatively coupled to a parent node. The means for receiving 902 may comprise a receiver or may be implemented in a processor. Also included is a means for determining a time each child node should be scheduled 904, which may comprise a scheduler or may be implemented in a processor. Such a determination can be made based on the desired throughputs. A means for determining whether the parent node is an obstruction 906 can determine whether the parent node is an obstruction based on the determined scheduled times. The means for determining whether the parent node is an obstruction 906 may comprise a scheduler or may be implemented in a processor. A means for determining a throughput 908 can also be included in system 900 and may comprise a value adjuster or may be implemented in a processor. Means for determining a throughput 908 can determine a throughput for supporting each data sink if the parent node is an obstruction. The means for determining a throughput 902 can determine the throughput for supporting each data sink based on a maxmin fairness concept.

Figure 10:
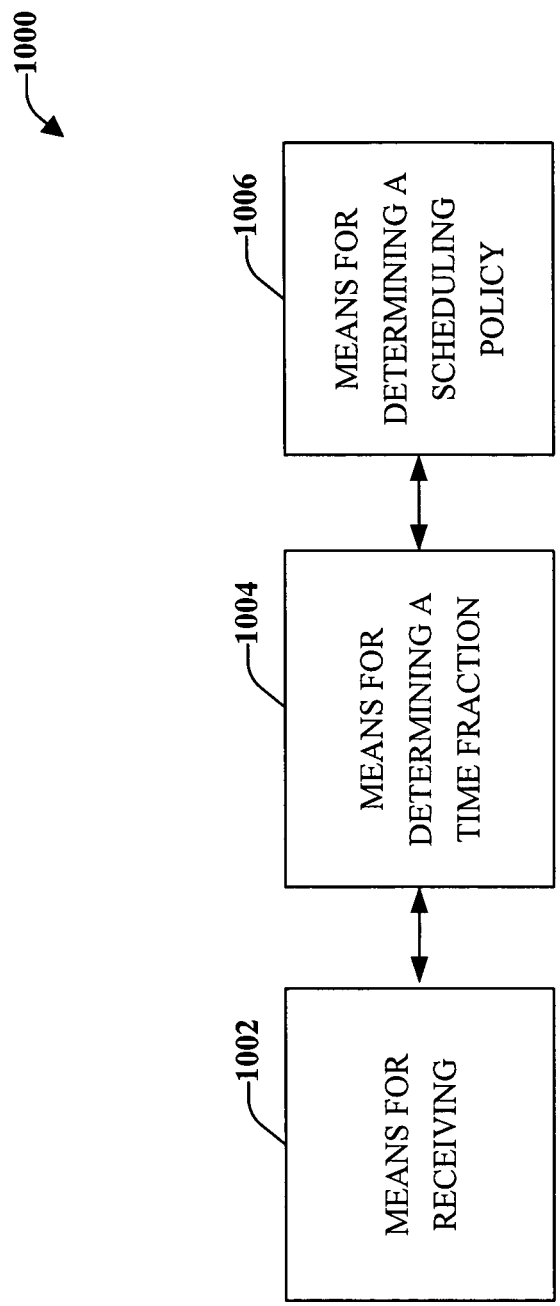
FIG. 10 is a system for supporting data communication in a wireless network of a plurality of nodes from the perspective of a root node.

FIG. 10 illustrates a system 1000 for supporting data communication in a wireless network of a plurality of nodes from the perspective of a root node. System 1000 can be implemented in a wireless device. System includes a means for receiving 1002 that can be configured to receive, at a root node, a desired throughput per data sink associated with each parent node. The means for receiving 1002 may comprise a receiver or may be implemented in a processor. The parent node, root node, and data sink are communicatively coupled. System 1000 also includes a means for determining a time fraction 1004, which may comprise a scheduler or may be implemented in a processor, that can determine a time fraction each parent node should be scheduled based on the desired throughput. A means for determining a scheduling policy 1006 can be configured to determine a scheduling policy based on the time fraction each parent node should be scheduled. Means for determining a scheduling policy 1006 may comprise a scheduler or may be implemented in a processor.

Figure 11:
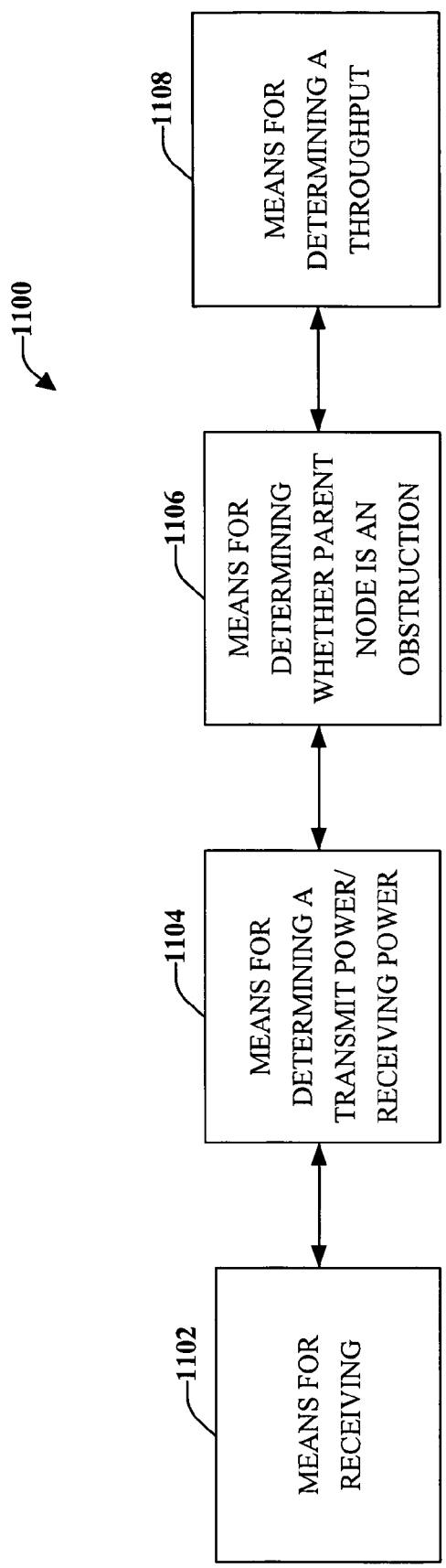
FIG. 11 is another embodiment of a system for supporting data communications in multi-hop wireless networks from the perspective of a parent node.

FIG. 11 is another embodiment of a system 1100 for supporting data communications in multi-hop wireless networks from the perspective of a parent node. Included in system 1100 is a means for receiving 1102 that can be configured to receive, at a parent node, a desired throughput per data sink associated with each child node. Means for receiving 1102 may comprise a receiver or may be implemented in a processor. The child node is communicatively coupled to the parent node. A means for determining a transmit power and/or a receive power 1104 can be configured to determine a transmit power or a receive power associated with each child node based on the desired throughput. Means for determining a transmit power and/or a receive power 1104 may comprise a calculator or may be implemented in a processor. In accordance with some embodiments, either or both transmit power and receive power can be determined. Also included in system 1100 is a means for determining whether the parent is an obstruction 1106 that can be configured to determine whether the parent node is an obstruction based on at least one of the determined transmit power and the receive power. Means for determining whether the parent is an obstruction 1106 may comprise a calculator or may be implemented in a processor. A means for determining a throughput 1108 may comprise a value adjuster or may be implemented by a processor. Means for determining a throughput 1108 can be configured to determine a throughput for supporting each data sink if the parent node is an obstruction.

Figure 12:
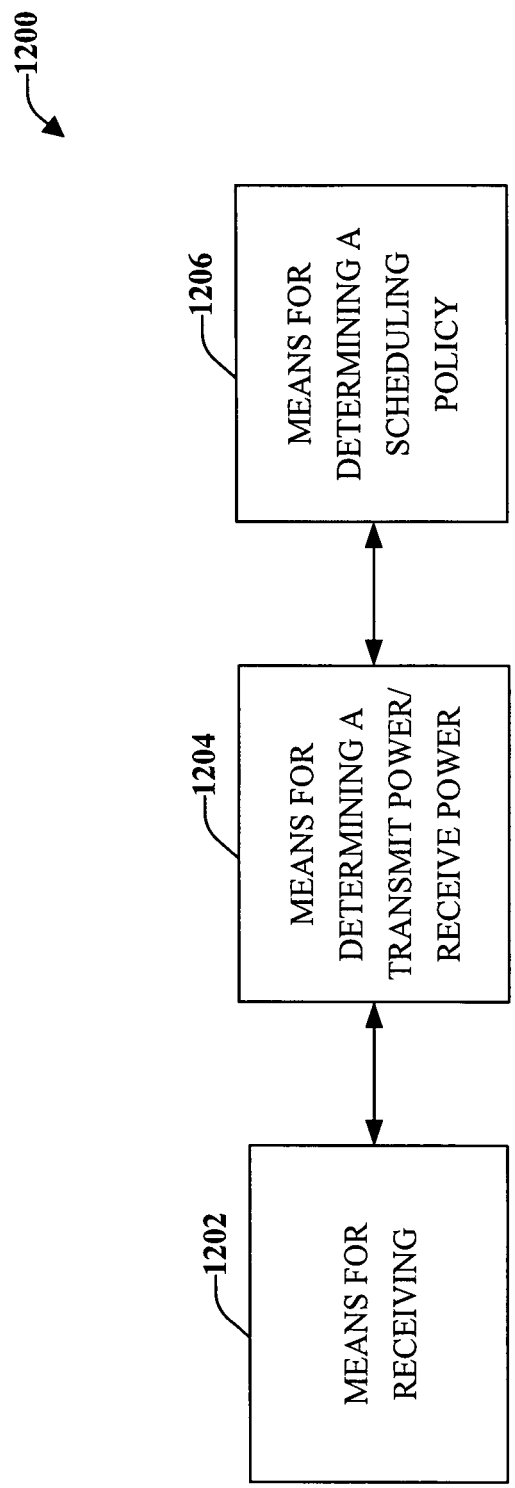
FIG. 12 is another embodiment of a system for supporting data communication in a wireless network of a plurality of nodes from the perspective of a root node.

FIG. 12 is another embodiment of a system 1200 for supporting data communication in a wireless network of a plurality of nodes from the perspective of a root node. System 1200 includes a means for receiving 1202, which can comprise a receiver or can be implemented by a processor. Means for receiving 1202 can be configured to receive, at a root node, a desired throughput per data sink associated with each parent node. The parent node, root node, and data sink are communicatively coupled. A means for determining a transmit power and/or a receive power 1204, which may comprise a calculator or may be implemented by a processor, can be configured to determine a transmit power and a receive power associated with each parent node based on the desired throughput. In accordance with some embodiments, either or both transmit power and receive power can be determined. Also included is a means for determining a scheduling policy 1206 that can be configured to determine a scheduling policy based on at least one of the determined transmit and receive powers. Means for determining a scheduling policy 1206 may comprise a calculator or may be implemented by a processor.

Figure 13:
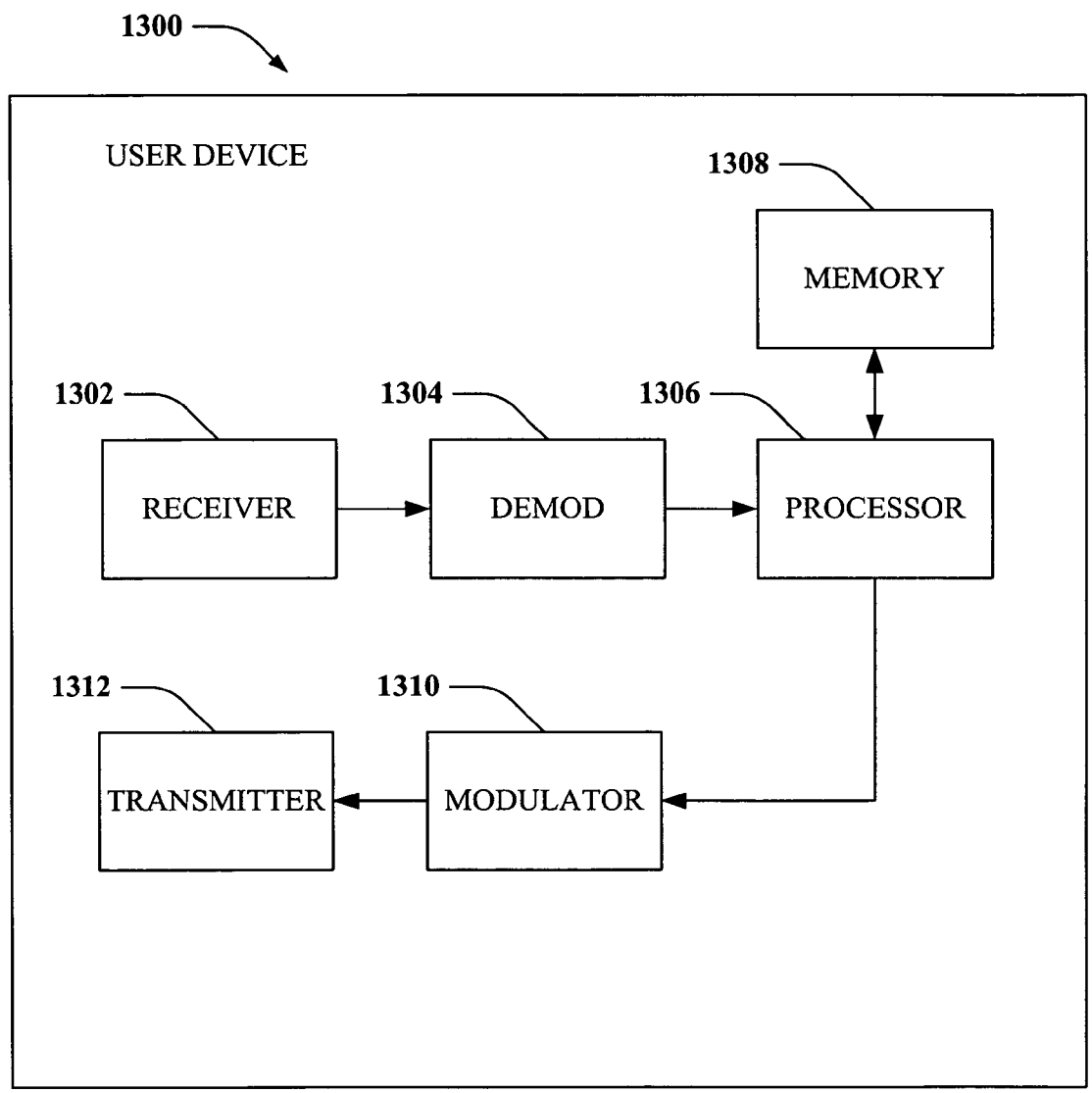
FIG. 13 illustrates a system that facilitates flow-based fair scheduling in a multi-hop wireless communication environment in accordance with one or more of the disclosed embodiments.

With reference now to FIG. 13, illustrated is a system 1300 that facilitates flow-based fair scheduling in a multi-hop wireless communication environment in accordance with one or more of the disclosed embodiments. System 1300 can reside in an access point and/or in a user device. System 1300 comprises a receiver 1302 that can receive a signal from, for example, a receiver antenna. The receiver 1302 can perform typical actions thereon, such as filtering, amplifying, etc. the received signal. The receiver 1302 can also digitize the signal to obtain samples. A demodulator 1304 can retrieve information bits from the received signals and provide them to a processor 1306.

Processor 1306 can be a processor dedicated to analyzing information received by receiver component 1302 and/or generating information for transmission by a transmitter 1312. In addition or alternatively, processor 1306 can control one or more components of user device 1300, analyze information received by receiver 1302, generate information for transmission by transmitter 1316, and/or control one or more components of user device 1300. Processor 1306 may include a controller component capable of coordinating communications with additional user devices.

User device 1300 can additionally comprise memory 1308 operatively coupled to processor 1306 and that can store information related to coordinating communications and any other suitable information. Memory 1308 can additionally store protocols associated with coordinating communication. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1308 of the subject systems and/or methods is intended to comprise, without being limited to, these and any other suitable types of memory. User device 1300 can further comprise a symbol modulator 1310 and a transmitter 1312 that transmits the modulated signal.

Figure 14:
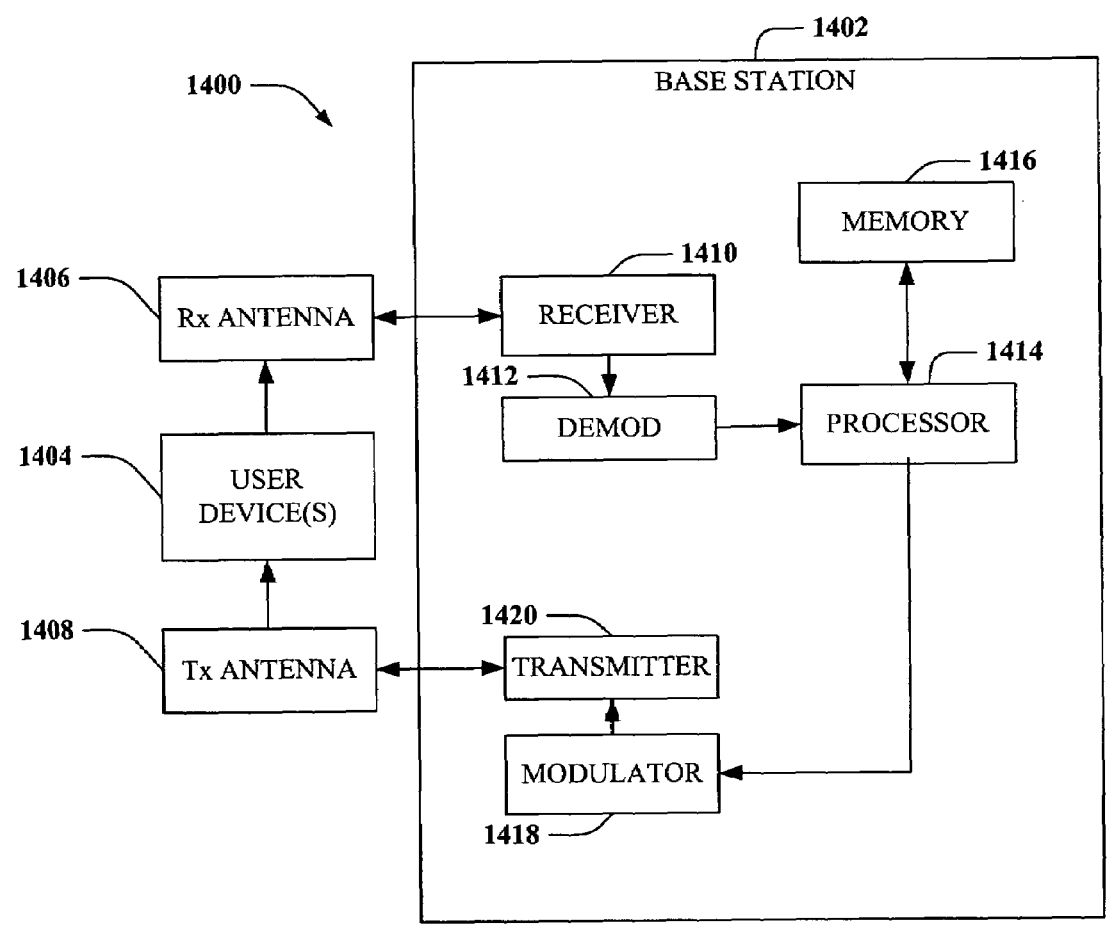
FIG. 14 is an illustration of a system that facilitates coordination of flow-based fair scheduling in accordance with various embodiments

FIG. 14 is an illustration of a system 1400 that facilitates coordination of flow-based fair scheduling in accordance with various embodiments. System 1400 comprises a base station or access point 1402. As illustrated, base station 1402 receives signal(s) from one or more user devices 1404 by a receive antenna 1406, and transmits to the one or more user devices 1404 through a transmit antenna 1408. However, one antenna can be utilized to both transmit and receive the signal according to some embodiments.

Base station 1402 comprises a receiver 1410 that receives information from receive antenna 1406 and is operatively associated with a demodulator 1412 that demodulates received information. Demodulated symbols are analyzed by a processor 1414 that is coupled to a memory 1416 that stores information related to the number of data sinks in a particular flow, a measured throughput rate, a computed throughput rate, and the like. A modulator 1418 can multiplex the signal for transmission by a transmitter 1420 through transmit antenna 1408 to user device(s) 1404.

Figure 15:
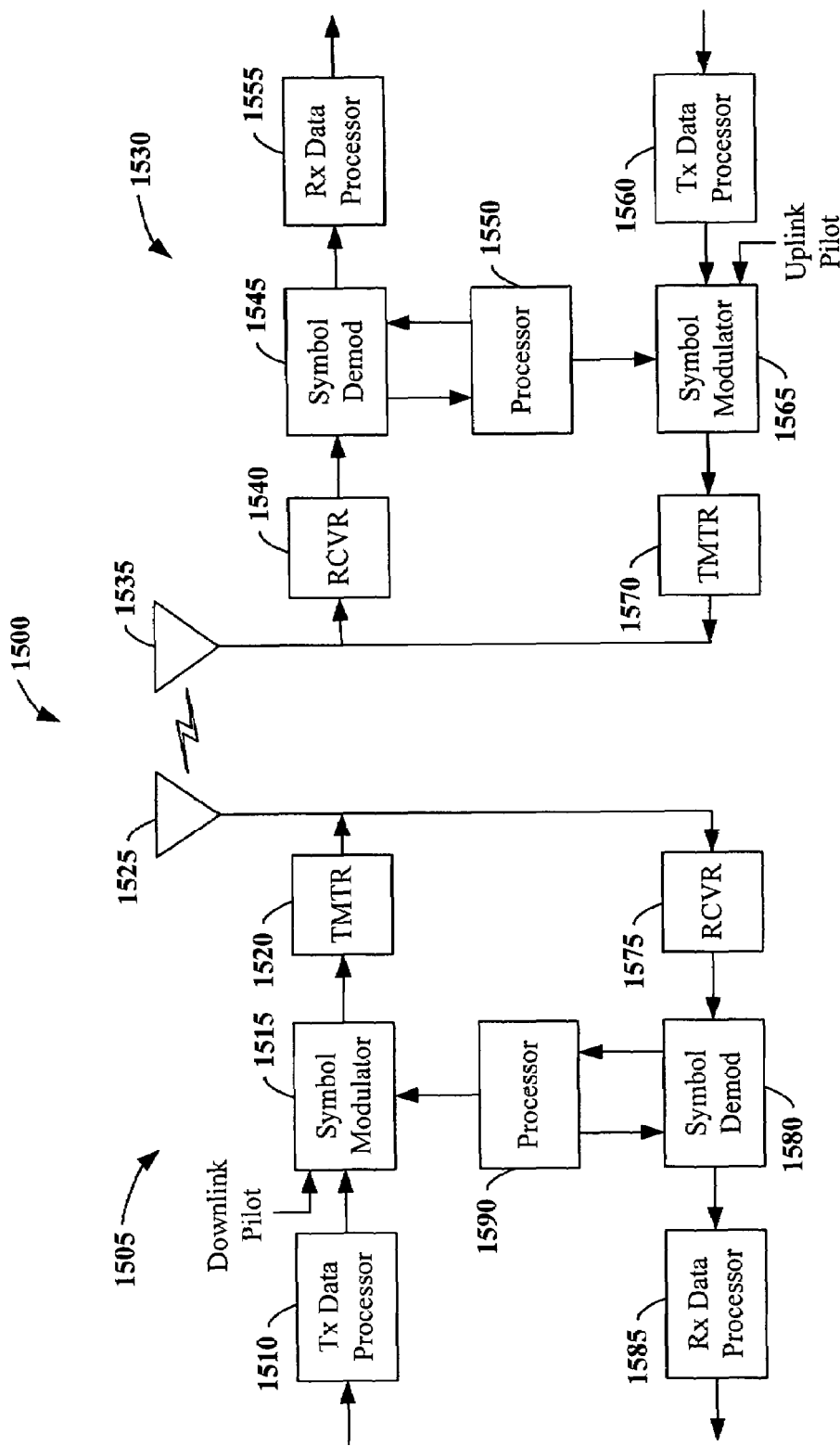
FIG. 15 illustrates a wireless communication environment that can be employed in conjunction with the various systems and methods described herein.

FIG. 15 illustrates an exemplary wireless communication system 1500. Wireless communication system 1500 depicts one base station and one terminal for sake of brevity. However, it is to be appreciated that system 1500 can include more than one base station or access point and/or more than one terminal or user device, wherein additional base stations and/or or terminals can be substantially similar or different from the exemplary base station and terminal described below. In addition, it is to be appreciated that the base station and/or the terminal can employ the systems and/or methods described herein to facilitate wireless communication there between.

Referring now to FIG. 15, on a downlink, at access point 1505, a transmit (TX) data processor 1510 receives, formats, codes, interleaves, and modulates (or symbol maps) traffic data and provides modulation symbols ("data symbols"). A symbol modulator 1515 receives and processes the data symbols and pilot symbols and provides a stream of symbols. A symbol modulator 1515 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 1520 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1525 to the terminals. At terminal 1530, an antenna 1535 receives the downlink signal and provides a received signal to a receiver unit (RCVR) 1540. Receiver unit 1540 conditions (e.g., filters, amplifies, and frequency downconverts) the received signal and digitizes the conditioned signal to obtain samples. A symbol demodulator 1545 obtains N received symbols and provides received pilot symbols to a processor 1550 for channel estimation. Symbol demodulator 1545 further receives a frequency response estimate for the downlink from processor 1550, performs data demodulation on the received data symbols to obtain data symbol estimates (which are estimates of the transmitted data symbols), and provides the data symbol estimates to an RX data processor 1555, which demodulates (i.e., symbol demaps), deinterleaves, and decodes the data symbol estimates to recover the transmitted traffic data. The processing by symbol demodulator 1545 and RX data processor 1555 is complementary to the processing by symbol modulator 1515 and TX data processor 1510, respectively, at access point 1505.

On the uplink, a TX data processor 1560 processes traffic data and provides data symbols. A symbol modulator 1565 receives and multiplexes the data symbols with pilot symbols, performs modulation, and provides a stream of symbols. A transmitter unit 1570 then receives and processes the stream of symbols to generate an uplink signal, which is transmitted by the antenna 1535 to the access point 1505.

At access point 1505, the uplink signal from terminal 1530 is received by the antenna 1525 and processed by a receiver unit 1575 to obtain samples. A symbol demodulator 1580 then processes the samples and provides received pilot symbols and data symbol estimates for the uplink. An RX data processor 1585 processes the data symbol estimates to recover the traffic data transmitted by terminal 1530. A processor 1590 performs channel estimation for each active terminal transmitting on the uplink.

Processors 1590 and 1550 direct (e.g., control, coordinate, manage, . . . ) operation at access point 1505 and terminal 1530, respectively. Respective processors 1590 and 1550 can be associated with memory units (not shown) that store program codes and data. Processors 1590 and 1550 can also perform computations to derive frequency and impulse response estimates for the uplink and downlink, respectively.

For a multiple-access system (e.g., FDMA, OFDMA, CDMA, TDMA, and the like.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1590 and 1550.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of supporting data communication, comprising:

receiving, from one or more child nodes, at a parent node, a desired throughput for one or more data sinks associated with each child node;

determining a length of time each child node should be scheduled for communication to the parent node based on the desired throughputs for one or more data sinks;

determining, at the parent node, whether the parent node is an obstruction based on the total length of the determined scheduled times for each child node; and determining a throughput for supporting each data sink if the parent node is an obstruction.

2. The method of claim 1, wherein the determining a time each child node should be scheduled and the determining whether the parent node is an obstruction are repeated for each ascending node up to a root node.

3. The method of claim 1, further comprising providing the determined throughput for supporting each data sink if the parent node is an obstruction to a root node.

4. The method of claim 3, further comprising receiving a scheduling policy from the root node, the scheduling policy based on the determined throughput for supporting each data sink.

5. The method of claim 1, the determining whether the parent node is an obstruction further comprising:
 identifying the child node whose at least one data sink needs a smallest throughput;
 assigning the smallest throughput to the at least one data sink associated with each child node;
 determining a fraction of time each child node should be scheduled for communication to the parent node based on the assigned smallest throughputs; and
 determining if the parent node is an obstruction based on the sum of the assigned smallest throughputs.

6. The method of claim 5, further comprising:
 determining if there is spare capacity if the parent node is not an obstruction; and
 assigning the spare capacity to the child nodes whose data sinks need a throughput higher than the assigned smallest throughput.

7. The method of claim 5, further comprising:
 assigning the smallest throughput to the child node whose at least one data sink needs the smallest throughput if the parent node is not an obstruction;
 removing the child node whose at least one data sink needs the smallest throughput from consideration;
 identifying a next child node whose at least one data sink needs a next smallest throughput from remaining child nodes;
 assigning the next smallest throughput to the at least one data sink associated with each remaining child node;
 determining a fraction of time each remaining child node should be scheduled for communication to the parent node based on the assigned next smallest throughputs; and
 determining if the parent node is an obstruction based on the sum of the assigned next smallest throughputs.

8. The method of claim 1, wherein determining a throughput for supporting each data sink if the parent node is an obstruction is based on a maxmin fairness concept.

9. The method of claim 1, determining whether the parent node is an obstruction comprising:
 determining if the total length of the determined scheduled times each child node should be scheduled is less than or equal to one; and
 determining that the parent node is not an obstruction if the determined total is less than or equal to one.

10. The method of claim 1, wherein the parent node is a terminal.

11. An apparatus for supporting data communication, comprising:

a receiver that receives, from one or more child nodes, a desired throughput for one or more data sinks associated with each child node communicatively coupled to a parent node;

a scheduler that determines a length of time each child node should be scheduled for communication to the parent node based on the desired throughputs for one or more data sinks, and determines whether the parent node is an obstruction based on the total length of the determined scheduled times; and a value adjuster that determines a throughput for supporting each data sink if the parent node is an obstruction.

12. The apparatus of claim 11, further comprising a transmitter that provides the determined throughput for supporting each data sink to a root node.

13. The apparatus of claim 12, wherein the receiver further receives a scheduling policy from the root node and wherein the scheduling policy is based on the determined throughput for supporting each data sink.

14. The apparatus of claim 11, wherein the value adjuster determines the throughput for supporting each data sink based on a maxmin fairness concept.

15. A computer readable medium encoded with instructions that, upon execution by an apparatus, cause the apparatus to:
 receive, from one or more child nodes, a desired throughput for one or more data sinks associated with each child node;
 determining a length of time each of the child node should be scheduled for communication to the apparatus based on the desired throughputs for one or more data sinks;
 determining whether the apparatus is an obstruction based on the total length of the determined scheduled times for each child node; and
 determining a throughput for supporting each data sink if the apparatus is an obstruction.

16. The computer readable medium of claim 15, wherein the instructions further cause the apparatus to provide the determined throughput for supporting each data sink if the apparatus is an obstruction to a root node.

17. The computer readable medium of claim 15, wherein the instructions for determining whether the apparatus is an obstruction further cause the apparatus to:
 determining if the total lengths of the determined scheduled time each child node should be scheduled is less than or equal to one; and
 determining that the apparatus is not an obstruction if the determined total time is less than or equal to one.

18. An apparatus for supporting data communication comprising:
 means for receiving, from one or more child nodes, a desired throughput for one or more data sinks associated with each child node;
 means for determining a of time each of the child nodes should be scheduled for communication to the apparatus based on the desired throughputs for one or more data sinks;
 means for determining whether the apparatus is an obstruction based on the total length of the determined scheduled times for each child node; and
 means for determining a throughput for supporting each data sink if the apparatus is an obstruction.

19. The apparatus of claim 18, wherein the means for determining a throughput for supporting each data sink if the apparatus is an obstruction determines the throughput based on a maxmin fairness concept.

20. An access point, comprising:

at least one antenna;

a receiver that receives, from one or more child nodes via the at least one antenna, a desired throughput for one or more data sinks associated with each child node, the child nodes communicatively coupled to the access point;

a scheduler that determines a length of time each of the child nodes should be scheduled for communication to the access point based on the desired throughputs for one or more data sinks, and determines whether the access point is an obstruction based on the total length of the determined scheduled times for each child node; and a value adjuster that determines a throughput for supporting each data sink if the access point is an obstruction.

* * * * *